US 10,982,994 B2

(12) United States Patent
Kochanowski

(10) Patent No.: US 10,982,994 B2
(45) Date of Patent: Apr. 20, 2021

(54) SCALE FOR AN INTERMODAL FREIGHT CONTAINER

(71) Applicant: George E. Kochanowski, Springboro, OH (US)

(72) Inventor: George E. Kochanowski, Springboro, OH (US)

( * ) Notice: Subject to any disclaimer, the term of this patent is extended or adjusted under 35 U.S.C. 154(b) by 201 days.

(21) Appl. No.: 16/091,820

(22) PCT Filed: Apr. 7, 2017

(86) PCT No.: PCT/US2017/026667
§ 371 (c)(1),
(2) Date: Oct. 5, 2018

(87) PCT Pub. No.: WO2017/177173
PCT Pub. Date: Oct. 12, 2017

(65) Prior Publication Data
US 2019/0120685 A1 Apr. 25, 2019

Related U.S. Application Data

(60) Provisional application No. 62/319,592, filed on Apr. 7, 2016.

(51) Int. Cl.
*G01G 19/12* (2006.01)
*B65D 88/52* (2006.01)

(52) U.S. Cl.
CPC ............. *G01G 19/12* (2013.01); *B65D 88/52* (2013.01); *B65D 88/522* (2013.01)

(58) Field of Classification Search
CPC ....... G01G 19/12; B65D 88/52; B65D 88/522
(Continued)

(56) References Cited

U.S. PATENT DOCUMENTS 3,128,897 A * 4/1964 Wilkins ................. B65D 90/02
220/1.5
3,684,122 A * 8/1972 Bonomi ............... B65D 88/522
220/1.5
(Continued)

FOREIGN PATENT DOCUMENTS

EP 2821761 1/2015
WO 2013025676 2/2013

OTHER PUBLICATIONS

International Search Report & Written Opinion for related PCT Application PCT/US2017/026667, dated Jun. 29, 2017 (12 pgs).
(Continued)

*Primary Examiner* — Randy W Gibson
(74) *Attorney, Agent, or Firm* — Brooks, Cameron & Huebsch, PLLC

(57) ABSTRACT

The present disclosure is to a scale for measuring a weight of a mass inside of an intermodal freight container. The scale includes a first bottom side rail, a second bottom side rail, a first cross-member and a second cross-member, where the cross-members join the first bottom side rail and the second bottom side rail. The scale further includes a jointed member having a first elongate section joined to the first bottom side rail with a first hinge, a second elongate section joined to the second bottom side rail with a second hinge, and a third hinge that connects the first elongate section and the second elongate section. A container floor is positioned over the jointed member to allow force from a weight of a mass on the container floor to be transferred through the hinges into a first lateral force through the first elongate section into the first bottom side rail, where a load cell associated with the first bottom side rail provides an electrical signal whose magnitude is representative of the first lateral force being imparted by the weight of the mass. A microprocessor
(Continued)

receives and stores in memory the electrical signal from the load cell indicating the weight of the mass inside of the intermodal freight container.

19 Claims, 24 Drawing Sheets

(58) Field of Classification Search
USPC .................................................. 177/126, 136
See application file for complete search history.

(56) References Cited

U.S. PATENT DOCUMENTS

| | | | | |
|---|---|---|---|---|
| 3,765,556 A * | 10/1973 | Baer | .................... | B65D 88/022 |
| | | | | 220/1.5 |
| 4,487,276 A * | 12/1984 | Swersey | .............. | G01G 19/445 |
| | | | | 177/1 |
| 4,726,486 A * | 2/1988 | Masuda | ............. | B65D 90/0086 |
| | | | | 220/1.5 |
| 5,190,179 A * | 3/1993 | Richter | ................ | B65D 90/008 |
| | | | | 220/6 |
| 6,357,194 B1 * | 3/2002 | Jones, Jr. | .............. | F16B 12/125 |
| | | | | 52/590.1 |
| 7,703,632 B2 * | 4/2010 | Kochanowski | ...... | B65D 88/005 |
| | | | | 220/666 |
| 7,741,569 B2 * | 6/2010 | Lin | ........................ | G01G 19/44 |
| | | | | 177/126 |
| 7,897,884 B2 * | 3/2011 | Harish | ............... | G01G 23/3735 |
| | | | | 177/144 |
| 8,011,523 B2 * | 9/2011 | Kochanowski | ...... | B65D 88/005 |
| | | | | 220/1.5 |
| 8,308,018 B2 * | 11/2012 | Kochanowski | ...... | B65D 88/005 |
| | | | | 220/666 |
| 8,344,272 B1 * | 1/2013 | Goldberg | ............. | A47C 31/126 |
| | | | | 177/126 |
| 8,573,433 B2 * | 11/2013 | Kochanowski | ...... | B65D 88/005 |
| | | | | 220/666 |
| 9,067,726 B2 * | 6/2015 | Kochanowski | ...... | B65D 88/005 |
| 9,181,024 B2 * | 11/2015 | Kochanowski | ...... | B65D 88/524 |
| 9,409,676 B2 * | 8/2016 | Kochanowski | ...... | B65D 88/005 |
| 9,701,464 B2 * | 7/2017 | Kochanowski | ...... | B65D 88/524 |
| 10,023,379 B2 * | 7/2018 | Kochanowski | ........ | B65D 88/52 |
| 10,501,262 B2 * | 12/2019 | Kochanowski | ...... | B65D 88/121 |
| 10,533,313 B2 * | 1/2020 | Kochanowski | ......... | E04B 1/344 |
| 10,549,908 B2 * | 2/2020 | Kochanowski | ........ | B65D 90/08 |
| 2010/0292063 A1 * | 11/2010 | Chawla | ................ | B65D 88/522 |
| | | | | 493/409 |

OTHER PUBLICATIONS

International Preliminary Report on Patentability for related PCT Application PCT/US2017/026667, dated Oct. 18, 2018 (8 pgs).

* cited by examiner

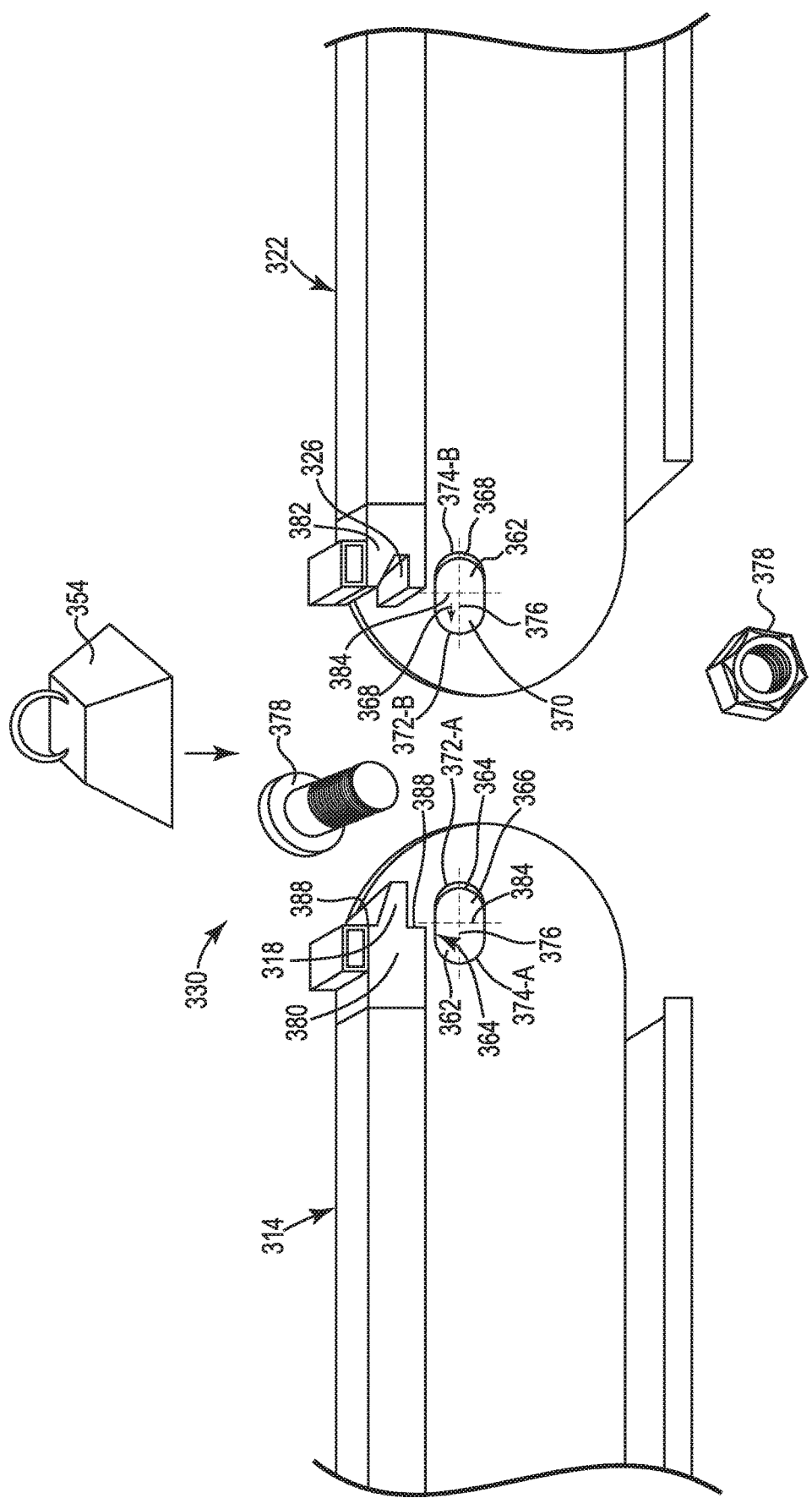

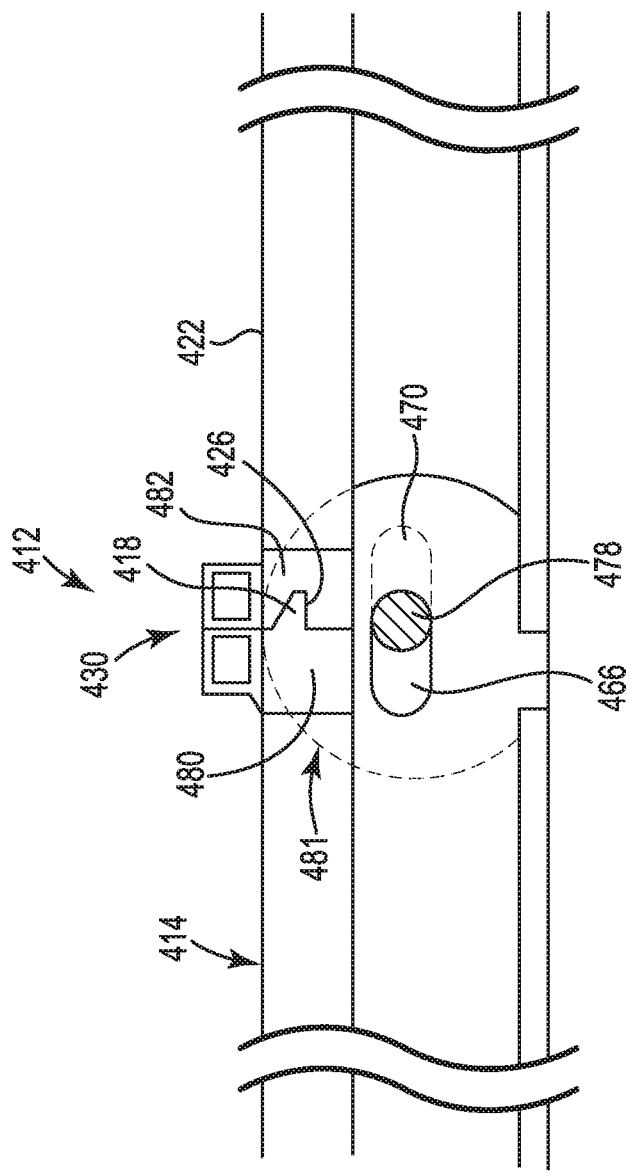

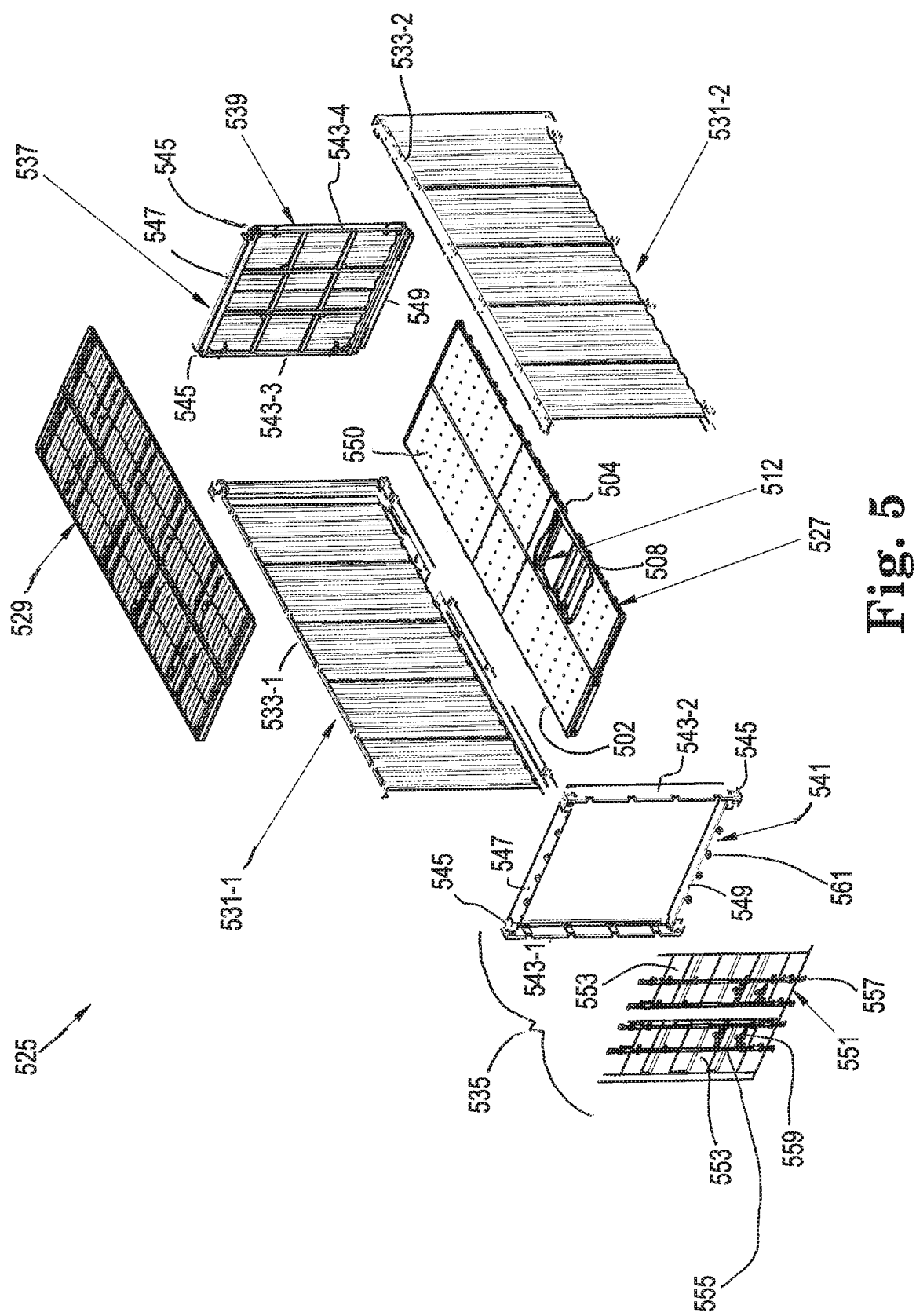

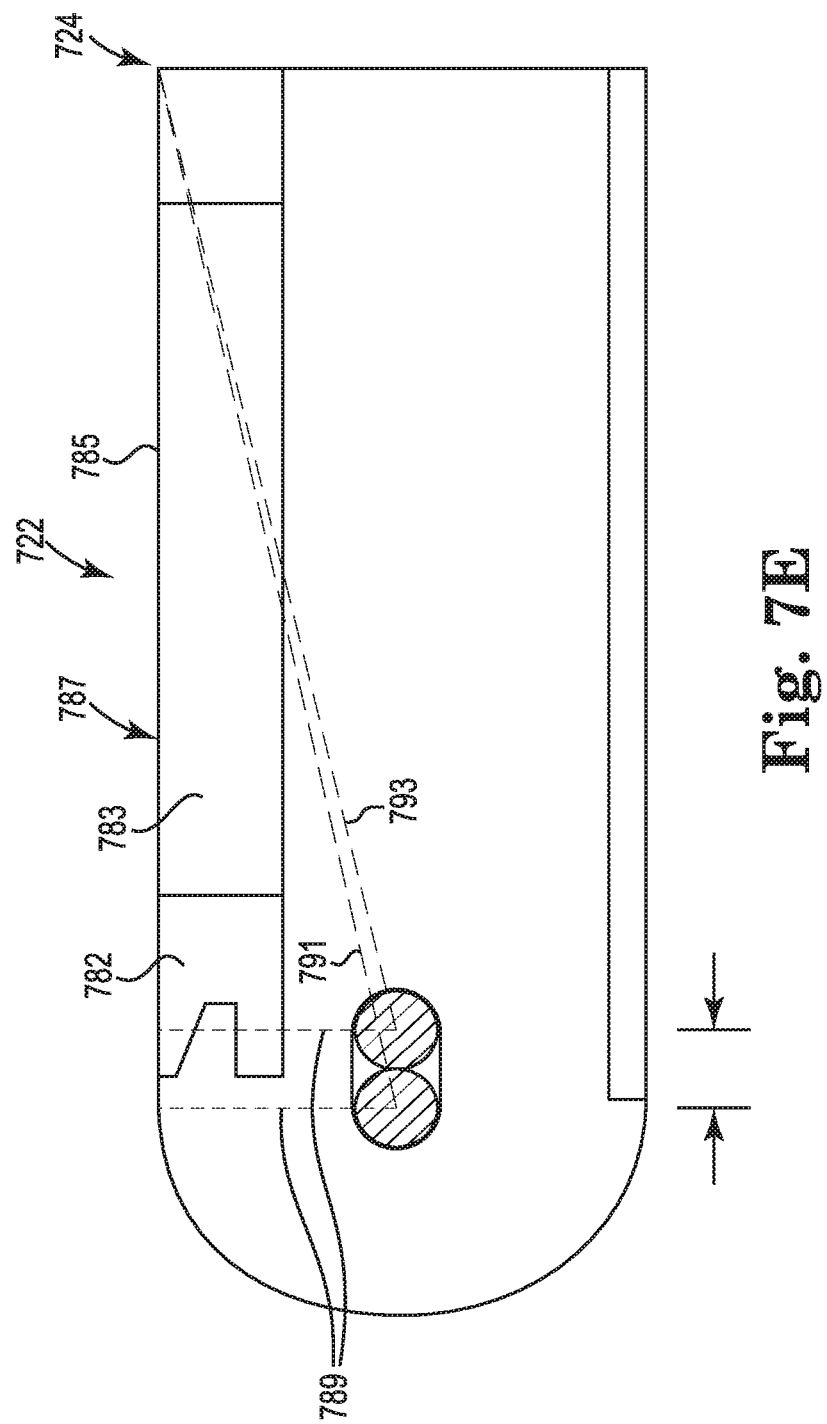

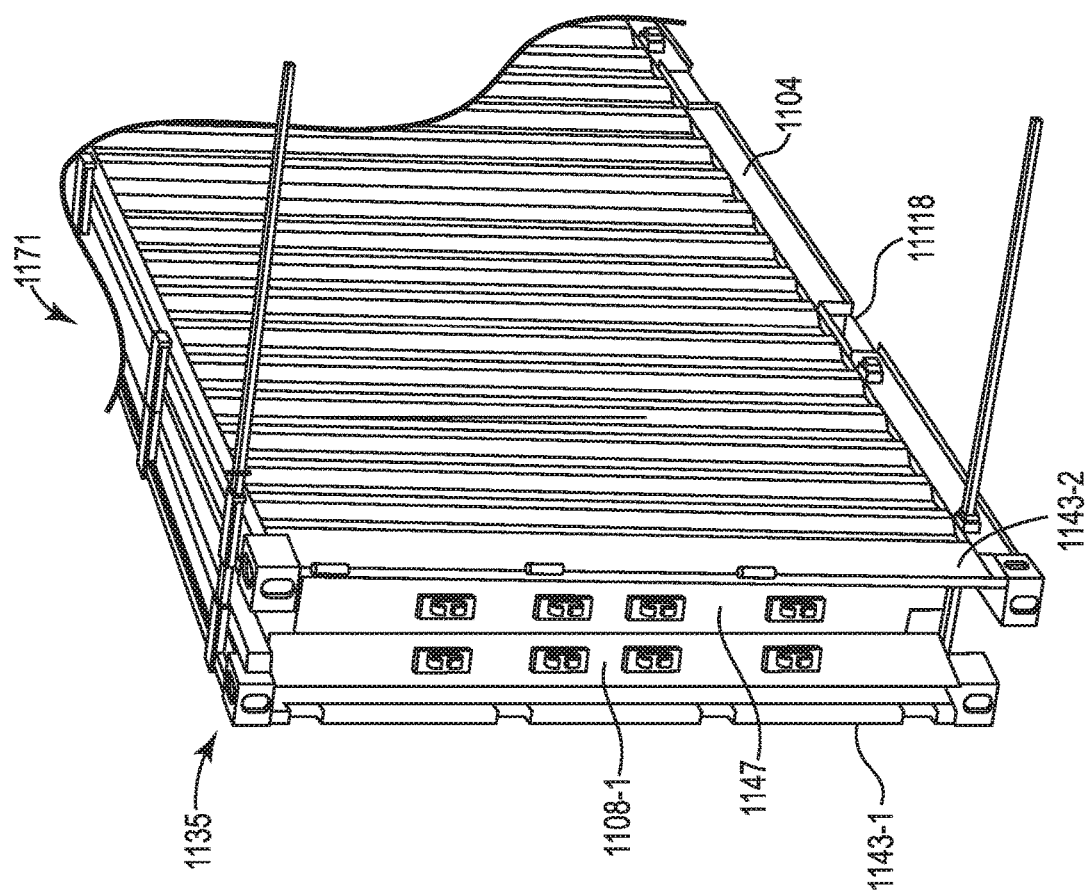

SCALE FOR AN INTERMODAL FREIGHT CONTAINER

This application is a National Stage Application under 35 U.S.C. § 371 of International Application Number PCT/US2017/026667, filed Apr. 7, 2017 and published as WO 2017/177173 on Oct. 12, 2017, which claims the benefit to U.S. Provisional Application 62/319,592, filed Apr. 7, 2016, the entire contents of which are incorporated herein by reference in its entirety.

FIELD OF DISCLOSURE

Embodiments of the present disclosure are directed to a scale; more specifically to a scale for weighing a mass inside of a container such as an intermodal freight container.

BACKGROUND

In the intermodal shipping industry, the International Organization for Standardization (ISO) intermodal freight container is the most widely used device to move goods. The ISO publishes and maintains standards for intermodal freight containers. These ISO standards for intermodal freight containers help provide that each intermodal freight container has similar physical properties. Examples of these physical properties include, but are not limited to, width, height, depth, base, maximum load, and shape of the intermodal freight containers.

The most common intermodal freight containers are either 20 feet in length or 40 feet in length, all of which are 8 feet in width, with some being 8 feet 6 inches in height with some being 9 feet 6 inches in height. In those countries where the road systems are quite developed, it is common to find even longer "swap body" intermodal freight containers of 45 foot and 53 foot in length. Regardless of length, all general purpose dry, intermodal freight containers are limited to a maximum gross weight of 67,400 pounds (30,572 kg), a Maximum Gross Mass value that is subject to change, where the actual weight of an intermodal freight container along with its contents is reported on a "bill of lading."

Regardless of this requirement, the weight of an intermodal freight container is often times inaccurate or misdeclared, either deliberately or because of inaccurate weighing systems. Regardless of the reason, the misdeclared weight of an intermodal freight container can be an issue for a customer's cargo, the intermodal freight container carrying the cargo, the ship carrying the intermodal freight container, and/or the people who handle and transport the cargo. For example, there are at least two major issues that can arise if an intermodal freight container is overweight. First, the overweight intermodal freight container can cause safety concerns. ISO intermodal freight container handling equipment is designed to meet global standards based around a maximum gross weight. Intermodal freight containers that exceed this maximum gross weight can cause issues to both the equipment and the people who handle the intermodal freight containers. In addition, the overweight intermodal freight container avoids fees, taxes and tariffs, which can be substantial. Another issue is when an intermodal freight container is under weight, as the operator responsible for balancing the entire vessel may be counting on a certain weight that is not present to keep a vessel in balance.

Changes that went into effect globally in July of 2016 make it mandatory for the shipper to verify the gross weight of an intermodal freight container using one of two methods: weighing the entire loaded intermodal freight container using calibrated and certified equipment or using a "calculated weight" method. The latter involves weighing the individual packages, plus dunnage and other such items and adding this total to the tare weight of the empty intermodal freight container. A certificate of weight will need to be provided.

Although the shipper has the primary responsibility of providing this certificate of weight, other parties must now also ensure that weights have been properly verified and for making that information available prior to ships being loaded. With the terminal operator being the last line of defense against a misdeclared intermodal freight container, the terminal operator will need to verify the accuracy of the declared weight of an intermodal freight container. This requirement to weigh the intermodal freight container at the port adds an enormous task to the already congested and time constrained terminal operation. Many in the industry argue that this check prior to loading is too late and freight containers should not be allowed to leave distribution centers or fulfillment houses without proper weight verification.

There is a need in the art, therefore, for weighing and verifying the weight of the mass inside of an intermodal freight container without having to move the intermodal freight container.

SUMMARY

The present disclosure can provide for weighing and verifying the weight of the mass inside of an intermodal freight container without having to move the intermodal freight container. To this end, the present disclosure provides a scale for measuring a weight of a mass inside of an intermodal freight container. The scale includes a first bottom side rail of the intermodal freight container and a second bottom side rail of the intermodal freight container, each of the first bottom side rail and the second bottom side rail having a longitudinal axis parallel to each other; a first cross-member and a second cross-member, where the first cross-member and the second cross-member join the first bottom side rail and the second bottom side rail of the intermodal freight container; a jointed member positioned longitudinally between the first cross-member and the second cross-member and laterally, relative the longitudinal axis, between the first bottom side rail and the second bottom side rail, the jointed member having: a first elongate section having a first member end and a second member end, where the first member end is joined to first bottom side rail with a first hinge, where the first hinge has a fixed axis of rotation relative to and parallel with the longitudinal axis of the first bottom side rail; a second elongate section having a first member end and a second member end, where the first member end is joined to second bottom side rail with a second hinge, where the second hinge has a fixed axis of rotation that is co-planar with the fixed axis of rotation of the first hinge and parallel with the longitudinal axes of the first bottom side rail and the second bottom side rail; and a third hinge that connects the second member end of the first elongate section and the second member end of the second elongate section, where the third hinge has an axis of rotation that is parallel with the fixed axis of rotation of the first hinge and the fixed axis of rotation of the second hinge; a load cell associated with the first bottom side rail; a container floor positioned over the jointed member to allow force from a weight of a mass on the container floor having the jointed member in the first predetermined state to be transferred through the third hinge, the first hinge and the second hinge into a first lateral force, relative the force from the weight of the mass, through the first member end of the first elongate section into the first bottom side rail, where the load cell provides an electrical signal whose magnitude is representative of the first lateral force being imparted by the weight of the mass, where the first cross-member and the second cross-member help to hold the first bottom side rail and the second bottom side rail of the intermodal freight container in static equilibrium against the first lateral force being imparted by the weight of the mass; and a controller having a microprocessor and memory, instructions stored in the memory and executable by the microprocessor, and a power source for the operation of the microprocessor and the load cell, where the microprocessor receives and stores in memory the electrical signal from the load cell indicating the weight of the mass inside of the intermodal freight container.

The first member end can include a first L-beam and the second member end can include a second L-beam, the first L-beam and the second L-beam extending parallel with the first bottom side rail and the second bottom side rail, and where the first hinge joins the first member end of the first elongate section along a first face of the first L-beam to the first bottom side rail and the second hinge joins the first member end of the second elongate section along a first face of the second L-beam to the second bottom side rail. Other beam shapes, as discussed herein, are possible. A second face of the first L-beam can transfer the first lateral force to the load cell associated with at least the first bottom side rail.

The load cells can be located in a variety of places on the scale. For example, the load cell in one embodiment is contained within the first bottom side rail of the container. The scale can also include two or more load cells. For example, the scale can further include a second load cell associated with the second bottom side rail, where force from the weight of the mass on the container floor having the jointed member in the first predetermined state is transferred through the third hinge, the first hinge and the second hinge into a second lateral force, relative the force from the weight of the mass, through the second member end of the second elongate section into the second bottom side rail, where the second load cell provides an electrical signal whose magnitude is representative of the second lateral force being imparted by the weight of the mass, where the first cross-member and the second cross-member help to hold the first bottom side rail and the second bottom side rail of the intermodal freight container in static equilibrium against the second lateral force being imparted by the weight of the mass; and where the power source allows for the operation of the microprocessor and the second load cell, and where the microprocessor receives and stores in memory the electrical signal from the second load cell indicating the weight of the mass inside of the intermodal freight container.

For the third hinge, the first elongate section of the jointed member includes a first surface defining a first obround opening, the second elongate section includes a second surface defining a second obround opening and the third hinge includes a fastener passing through the first obround opening and the second obround opening to connect the first elongate section and the second elongate section, where the fastener in a first predetermined state has a longitudinal axis that is offset from but parallel with the fixed axis of rotation of the first hinge and the fixed axis of rotation of the second hinge. The first elongate section can further include a first abutment member opposite the first member end, and the second elongate section can further include a second abutment member opposite the second member end, where in the first predetermined state the first abutment member and the second abutment are in physical contact and a portion of the first surface and a portion of the second surface are in physical contact with the fastener to transfer the force from the weight of the mass on the container floor having the jointed member in the first predetermined state through the first hinge, the second hinge and the fastener into the first lateral force. In one embodiment, the first abutment member and the second abutment member form an abutment joint, where: the first abutment member has a projection that extends from first abutment member shoulders of the first abutment member, the projection having a distal end from which a first surface and a second surface extend towards the first abutment member shoulders at an acute angle; and where the second abutment member has a socket into which the projection of the first abutment member releasably seats, the socket having a first surface and a second surface that extend away from a first end of the second abutment member at an acute angle and the first end of the second abutment member includes second abutment member shoulders that extends from the socket such that when the projection of the first abutment member seats in the socket of the second abutment member the second surface of the projection and the second surface of the socket touch, and the second abutment member shoulders and the first abutment member shoulders touch.

For the scale, an upper surface of the first cross-member and the second cross-member that is closest to the container flooring is located at a vertical position on the first bottom side rail and the second bottom side rail that is offset from an upper surface of the first elongate section and the second elongate section. This allows for a situation where the container floor does not contact the first cross-member and the second cross-member joining the first bottom side rail and the second bottom side rail of the intermodal freight container. Other embodiments where the container floor does contact the first cross-member and the second cross-member joining the first bottom side rail and the second bottom side rail of the intermodal freight container are also possible and discussed herein.

In one embodiment, the first cross-member and the second cross-member are not joined to a hinge or form a part of a hinge with the first bottom side rail and the second bottom side rail, respectively, of the intermodal freight container. In an alternative embodiment, the first cross-member and the second cross-member are joined to a hinge or form a part of a hinge with the first bottom side rail and the second bottom side rail, respectively, of the intermodal freight container.

In certain embodiments, the first obround opening and the second obround opening of the third hinge can move relative each other and the fastener as the jointed member transitions from the first predetermined state towards a second predetermined state. These embodiments include when the jointed member is used in reversibly foldable intermodal freight containers, as discussed herein. For example, the first obround opening and the second obround opening can move relative each other and the fastener as the jointed member transitions from the first predetermined state having a minimum overlap of the first obround opening and the second obround opening and the projection of the first abutment member is seated in the socket of the second abutment member towards the second predetermined state having a maximum overlap of the first obround opening and the second obround opening relative the minimum overlap and the projection of the first abutment member un-seated from the socket of the second abutment member. The advantage of using this embodiment of the third hinge is that in the first predetermined state a distance between the first member end of the first elongate section and the second member end of the second elongate section provides a defined maximum length of the jointed member, where the distance between the first member end of the first elongate section and the second member end of the second elongate section does not exceed a defined maximum length as jointed member transitions from the first predetermined state towards the second predetermined state. This advantage is achieved by having the first abutment member and the second abutment member define a first point of rotation for the first elongate section and the second elongate section; and a second end of both the first surface and the second surface, when positioned against the fastener, define a second point of rotation for the first abutment member and the second abutment member that is different than the first point of rotation, where the first elongate section and the second elongate section turn on the first point of rotation prior to turning on the second point of rotation as the jointed member transitions from the first predetermined state towards the second predetermined state. This change in point of rotation happens as the first elongate section and the second elongate section slide relative each other, which allows for a change in the length of a hypotenuse (as discussed herein) of the jointed member as the third hinge fold or unfolds, thereby preventing damage to the jointed member, associated hinges and structures.

The scale of the present disclosure can be used with a number of different containers. For example, an intermodal freight container includes the scale of the present disclosure. In an additional embodiment, a reversibly foldable intermodal freight container includes the scale of the present disclosure.

BRIEF DESCRIPTION OF THE FIGURES

FIGS. 3A-3D are perspective views of a third hinge and portions of the third hinge for the jointed member of the scale according to an embodiment of the present disclosure.

FIG. 4 is a side view of the third hinge of the jointed member that includes the first elongate section, the second elongate section and the abutment joint according to an embodiment of the present disclosure.

FIG. 5 is an exploded view of an intermodal freight container that includes the scale of the present disclosure.

FIGS. 7A-7E illustrate a side view of the jointed member transitioning from a first predetermined state towards the second predetermined state without the jointed member extending beyond its defined maximum length, according to an embodiment of the present disclosure.

FIGS. 11A-11D illustrate a rear wall of the reversibly foldable intermodal freight container according to an embodiment of the present disclosure.

Figure 1:
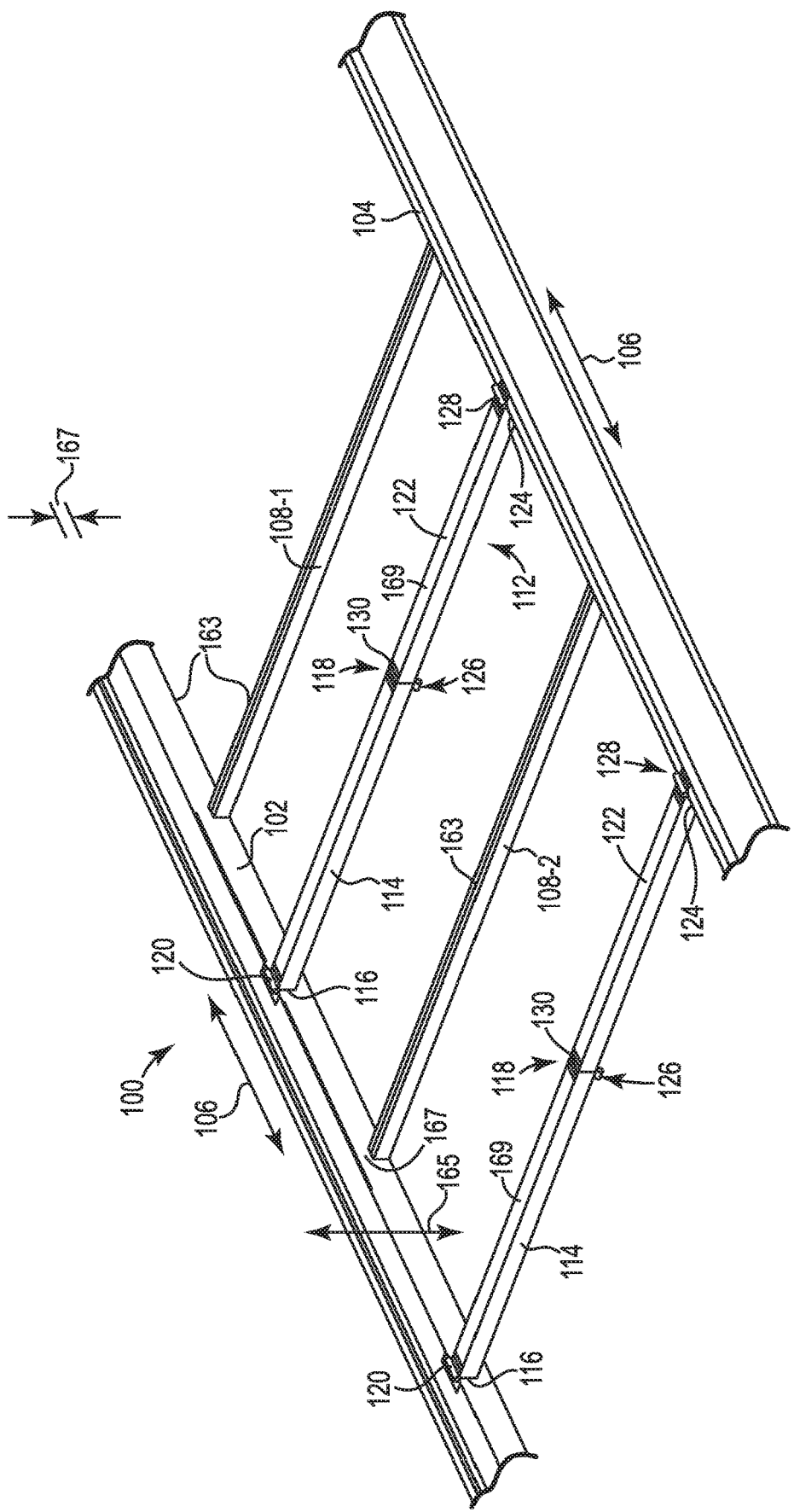
FIG. 1 is a perspective view of a portion of a scale for an intermodal freight container according to an embodiment of the present disclosure, where portions of the intermodal freight container have been removed to show detail.

The illustrations in the figures are not necessarily to scale.

DETAILED DESCRIPTION

As used herein a "scale" is defined as an instrument or a machine for weighing a mass to provide a weight, where the weight of the mass is taken to be the force on the mass due to gravity. Typically, a scale in weighing a mass counterbalances the mass in the opposite or in the same direction of gravity. Using this approach, one can imaging adding a "scale" to a container, such as an intermodal freight container compliant with ISO standards, in which a 40 foot long 8 foot wide "bathroom scale" is added to the floor structure. However, to get a good weight reading using this configuration, the floor structure of the intermodal freight container would need to be significantly stiffen by either adding more cross members or using cross members of considerably more weight between the side rails to create a rigid surface and then place a number of load cells onto this now stiffer structure and let the wood floor sit atop the load cells. This means not affixing the top layer of wood to the rigid structure. This new floating structure would need to made sturdier and stiffer, adding weight and consuming additional container volume. Nonetheless this giant "bathroom scale" would need to be attached to the rigid sub-assembly by some means that would keep the floating floor from coming apart from the container. Additionally, springs would likely be need between the two structures to let the load cells do their work. The numerous load cells would be electronically or mechanically interconnected to sum the readings to give an accurate total weight. In another embodiment, one could separate the wood sections into weighing zones, and provide zone weights. In either case, the summed information would provide the accurate weight of the contents sitting on the floor. This information can be then displayed locally electronically, or transmitted wirelessly to any network as desired, as discussed herein.

In a more preferred approach, embodiments of the present disclosure provide for a scale for a container, such as an intermodal freight container, that includes a scale according to the present disclosure. The scale of the present disclosure can weigh a mass on the container flooring of the intermodal freight container. The scale is positioned under a container flooring of the intermodal freight container that allows the weight of the mass in the intermodal freight container to be measured separate from the gross weight of the intermodal freight container. In addition, positioning the scale under the container flooring also allows for the weight of the mass in the intermodal freight container to be measured in any number of places, such as when the intermodal freight container is on the ground, positioned on a tractor trailer, on a ship or suspended by a lift, among other places.

The design of the scale of the present disclosure also allows for it to be retrofitted into existing containers, such as intermodal freight containers compliant with ISO standards, without changing the height or configuration of the container flooring of the container. Retrofitting the scale of the present disclosure into an existing intermodal freight container can include removing a portion of the container flooring and replacing one or more of the cross members of the intermodal freight container with a jointed member of the present disclosure, as will be discussed herein.

As discussed herein, in operation the jointed member transfers a portion of the force from the weight of the mass sitting on the container floor into a transvers force that extends through the jointed member to the side rails of the container. This is accomplished by the jointed member having two elongate sections that are joined at a first end to the side rails with a first hinge and a second hinge, respectively, and at a second end to each other using a third hinge. This series of hinges allows for the portion of the force caused by the mass sitting on the container floor to be re-directed into the transvers force that extends through the jointed member to the side rails of the container. A load cell is located in and/or on a side rail in the area adjacent to the first end of the elongate section. The load cell receives the transverse force passing through the joined member and produces an electrical signal that is directly proportional to the weight of the mass on the floor of the container.

Once retrofitted into an existing container (e.g., an intermodal freight container compliant with ISO standards), the portion of the container flooring is repositioned and re-secured over the jointed member of the scale. In this way existing intermodal freight containers can quickly and effectively be fitted with a scale to measure the weight of a mass sitting on the container flooring of the container. The intermodal freight container mentioned above is an example of any number of non-foldable containers that the scale of the present disclosure can be used with. In another example, the scale of the present disclosure can be used with a reversibly foldable intermodal freight container, as discussed herein.

As used herein, "a," "an," "the," "at least one," and "one or more" are used interchangeably. The term "and/or" means one, one or more, or all of the listed items. The recitations of numerical ranges by endpoints include all numbers subsumed within that range (e.g., 1 to 5 includes 1, 1.5, 2, 2.75, 3, 3.80, 4, 5, etc.). The figures herein follow a numbering convention in which the first digit or digits correspond to the drawing figure number and the remaining digits identify an element in the drawing. Similar elements between different figures may be identified by the use of similar digits. For example, 354 may reference element "54" in FIG. 3, and a similar element may be referenced as 1454 in FIG. 14. It is emphasized that the purpose of the figures is to illustrate and the figures are not intended to be limiting in any way. The figures herein may not be to scale and relationships of elements in the figures may be exaggerated. The figures are employed to illustrate conceptual structures and methods herein described.

Angle measurements discussed herein are measured as either acute angles (angles smaller than 90 degrees (less than 90°) or obtuse angles (angles greater than 90° but less than 180°) where the measurements of the surfaces discussed herein are taken so as to exclude values that are reflex angles (those angles from 180° to 360°.

Figure 2:
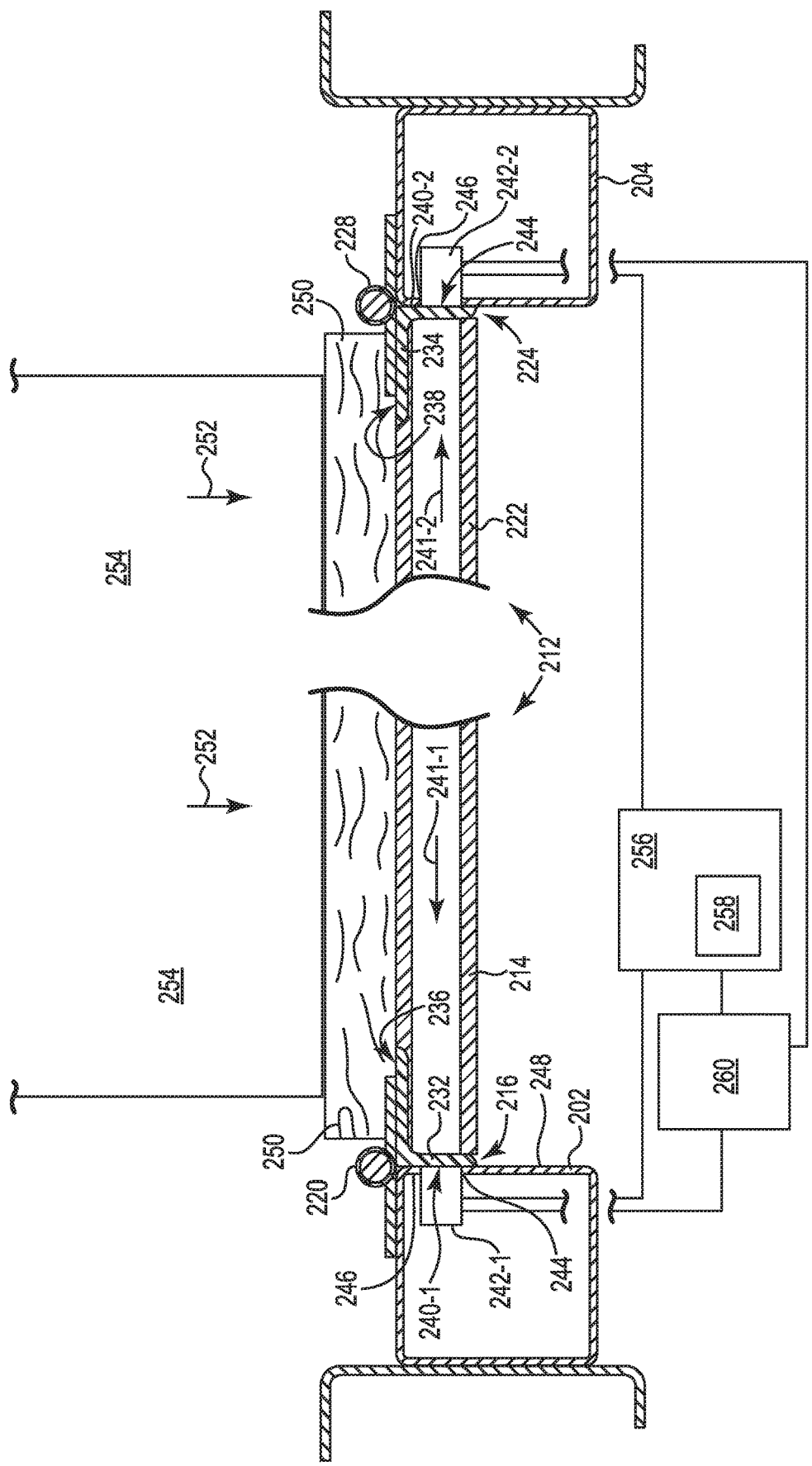
FIG. 2 is a cross-sectional view of a portion of bottom side rails, elongate sections and hinges of a jointed member according to an embodiment of the present disclosure.

The present disclosure provides for a scale for measuring a weight of a mass inside of an intermodal freight container. In describing the scale the following discussion will reference several figures that taken together form embodiments of the present invention. Due to the level of detail, the scale is illustrated and described using a series of Figures that best illustrate the portion of the scale that is being described. As discussed below, FIG. 1 illustrates a portion of a sub-floor of the intermodal freight container that lies beneath the container flooring, where the sub-floor is shown with a jointed member of the scale. FIG. 2 illustrates a cut-away view of a portion of the sub-floor, where the location of the load cell and the associated electronics are illustrated. FIGS. 3A-3D illustrate an embodiment of the third hinge of the scale. FIG. 4 provides an illustration of the third hinge of the joined member of the scale in a first predetermined position. Finally, FIG. 5 illustrates an intermodal freight container in an exploded view with a cut-away of the container flooring to show the jointed member and cross-members of the sub-floor.

The embodiments illustrated and discussed for FIGS. 1-5 are directed to using the scale of the present disclosure in a traditional intermodal freight container (e.g., an intermodal freight container that complies with ISO standards). The scale of the present disclosure can be integrated into the intermodal freight container during their construction (e.g., new construction) or the scale can be "retrofitted" into an existing intermodal freight container.

Referring now to FIG. 1, there is illustrated a portion of a sub-floor of the intermodal freight container that lies beneath the container flooring, where the sub-floor is shown with a jointed member of the scale. FIG. 1 illustrates one embodiment of the scale 100 for measuring a weight of a mass inside of the intermodal freight container. The scale 100 includes a first bottom side rail 102 and a second bottom side rail 104, where each of the first bottom side rail 102 and the second bottom side rail 104 have a longitudinal axis 106 parallel to each other. The scale 100 further includes one or more of a cross-member 108, where the cross-member 108 join the first bottom side rail 102 and the second bottom side rail 104 of the intermodal freight container. As illustrated, the sub-floor of the intermodal freight container seen in FIG. 1 includes a first cross-member 108-1 and a second cross-member 108-2, where using more than two of the cross-members 108 is possible.

The scale 100 further includes a jointed member 112. As illustrated in the present embodiment, the jointed member 112 is positioned longitudinally between two of the cross-members 108-1 and 108-2 and laterally, relative the longitudinal axis 106, between the first bottom side rail 102 and the second bottom side rail 104. The jointed member 112 includes a first elongate section 114 having a first member end 116 and a second member end 118. The first member end 116 is joined to first bottom side rail 102 with a first hinge 120. The first hinge 120 has a fixed axis of rotation relative to and parallel with the longitudinal axis 106 of the first bottom side rail 102. The joined member 112 further includes a second elongate section 122 having a first member end 124 and a second member end 126. The first member end 124 is joined to second bottom side rail 104 with a second hinge 128. The second hinge 128 has a fixed axis of rotation that is co-planar with the fixed axis of rotation of the first hinge 120 and parallel with the longitudinal axes 106 of the first bottom side rail 102 and the second bottom side rail 104.

The first bottom side rail 102 and the second bottom side rail 104 can have a variety of configurations. For example, the first bottom side rail 102 and the second bottom side rail 104 can have a polygonal tubular configuration, such as a length of square tubular or a length of rectangular tubing. Alternatively, the first bottom side rail 102 and the second bottom side rail 104 can have a contiguous solid structure. The first bottom side rail 102 and the second bottom side rail 104 could also have a planar truss and/or a space truss configuration.

The first hinge 120 and the second hinge 128 can take a variety of forms. For example, the first hinge 120 and the second hinge 128 can be in the form of a barrel hinge, a piano hinge, an overlay hinge or a butt hinge. A first leaf of each of the first hinge 120 and the second hinge 128 can be joined to the first bottom side rail 102 and the second bottom side rail 104, respectively, using welding techniques (e.g., shielded metal arc welding, gas metal arc welding, submerged arc welding, among others). Similarly, the second leaf of each of the first hinge 120 and the second hinge 128 can be joined to the first elongate section 114 and the second elongate section 122, respectively, using the welding techniques discussed herein. Mechanical fasteners can also be used to join the first hinge 120 and the second hinge 128 to the structures as described herein, where such mechanical fasteners include, but are not limited to, rivets and/or bolts that use a nut, among other fasteners. The cross-members 108 can be continuous structures that are joined to the first bottom side rail 102 and the second bottom side rail 104, respectively, using the welding techniques discussed herein. The cross-members 108 can have a square or rectangular cross-section and be tubular or solid.

A third hinge 130 connects the second member end 118 of the first elongate section 114 and the second member end 126 of the second elongate section 122. The third hinge 130 has an axis of rotation that is parallel with the fixed axis of rotation of the first hinge 120 and the fixed axis of rotation of the second hinge 128. The third hinge 130 can be positioned approximately at the mid-point of the overall length of the joined member 112. For the scale 100, the series of hinges (e.g., the first hinge 120, second hinge 128 and third hinge 130) allows each of the first elongate section 114 and the second elongate section 122 to transfers a portion of the force caused by a mass sitting on the container floor into a transvers force that extends through the jointed member to the side rails of the container.

The third hinge 130 can be located at any number of vertical positions 165 on the jointed member 112. For example, the third hinge 130 can be positioned along the upper surface 169 of the first elongate section 114 and the second elongate section 122. Alternatively, the third hinge 130 can be positioned along a lower surface (opposite the upper surface 169) of the first elongate section 114 and the second elongate section 122. Finally, the third hinge 130 can be positioned between the upper surface 169 and the lower surface of the first elongate section 114 and the second elongate section 122, an embodiment which will be described herein.

The third hinge 130 can have a variety of forms. For example, the third hinge 130 can be in the form of a barrel hinge, a piano hinge, an overlay hinge or a butt hinge. A first leaf of the third hinge 130 can be joined to the second end 118 of the first elongate section 114 while the second leaf of the third hinge 130 can be joined to the second end 126 of the second elongate section 122, respectively, using welding techniques (e.g., shielded metal arc welding, gas metal arc welding, submerged arc welding, among others). The third hinge 130 can also be in the form of a "jointed member" where embodiments of this jointed member are discussed herein and also in PCT publications WO 2013/025663 and WO 2014/028000, which are both incorporated herein by reference in their entirety. Embodiments of the third hinge 130 in the form of the jointed member are discussed below.

As seen in FIG. 1, the scale 100 of the present disclosure has an articulating structure having two (2) edge pivot points (e.g., the first hinge 120 and the second hinge 128) and a center pivot (e.g., the third hinge 130). The statics and dynamics of this three pivot point system take the vertical mass sitting on the floor and directs the force caused by the mass laterally against the side rail, and with the static cross members being of fixed length keeping the side rails from expanding beyond desired limits one or more load cells can be mounted within the side rails and, or at the center pivot to measure the weight of the mass.

FIG. 1 also illustrates an embodiment of the scale 100 in which an upper surface 163 of the first cross-member 108-1 and the second cross-member 108-2 closest to the container flooring is located at a vertical position 165 on the first bottom side rail 102 and the second bottom side rail 104 that is offset 167 from an upper surface 163 of the first elongate section 114 and the second elongate section 122. For example, as illustrated the upper surface 163 of the first cross-member 108-1 and the second cross-member 108-2 closest to the container flooring is below the upper surface 169 of the first elongate section 114 and the second elongate section 122. This configuration allows for an embodiment in which the container floor does not contact the first cross-member and the second cross-member joining the first bottom side rail and the second bottom side rail of the intermodal freight container. Alternatively, the relative positions of the upper surface 163 of the first cross-members and the upper surface 169 of the first elongate section 114 and the second elongate section 122 can at least be partially in contact with the container flooring such that the container flooring can contact only the upper surface 169 of the first elongate section 114 and the second elongate section 122 when there is no mass present in the intermodal freight container, but as mass is added onto the container flooring the jointed member 112 can deflect so as to allow the container floor to come into contact with the upper surface 163 of the cross-members (e.g., the first cross-member 108-1 and the second cross-member 108-2). It is also possible that no offset 167 is present so that the container floor is in contact with the upper surface 163 of the cross-members 108 and the upper surface 169 of the first elongate section 114 and the second elongate section 122.

As noted above, FIG. 1 illustrates only a portion of a sub-floor of the intermodal freight container that lies beneath the container flooring. FIG. 1 also provides an illustration with two of the cross-members 108. It is understood that the sub-floor of the intermodal freight container that lies beneath the container flooring can include more than two of the cross-members 108 that join the first bottom side rail 102 and the second bottom side rail 104 of the intermodal freight container. For example, a typical 40 foot intermodal freight container can include up to twelve (12) of the cross-members 108. As discussed herein, at least one of these cross-members 108 can be removed and replaced with the jointed member 112 to form an embodiment of the scale of the present disclosure. In an additional embodiment, two or more of the cross-members 108 can be removed and replaced with the jointed member 112 to form an embodiment of the scale of the present disclosure.

For the various embodiments, the static interaction of the cross-members 108 with the jointed member 112, under a compressive force, allow the sub-floor to be of sufficient strength to carry mass inside the intermodal freight container (e.g., as prescribed in ISO standard 1496).

As discussed herein, when two or more of the jointed members 112 are used in the intermodal freight container, each of the jointed members 112 can be used with the other jointed members 112 to provide a total weight of the mass positioned on the container flooring of the intermodal freight container. Each of the jointed members 112 can also be used separately from the other joined members 112 to provide a weight of a mass in a predefined area of the container flooring of the intermodal freight container. These and other embodiments will be discussed more fully herein.

FIG. 2 provides a cross-sectional view of a portion of the first bottom side rail 202, the first elongate section 214 and the first hinge 220 of the jointed member 212 along with a portion of the second bottom side rail 204, the second elongate section 222 and the second hinge 228 of the jointed member 212. As illustrated, each of the first bottom side rail 202 and the second bottom side rail 204 has a polygonal tubular cross section. The first bottom side rail 202 and the second bottom side rail 204 each span a length of the intermodal freight container where they can be joined to the corner fittings of the intermodal freight container.

Each of the first elongate section 214 and the second elongate section 222 can further include an L-beam (also known as "angle"). As illustrated in FIG. 2, the first member end 216 of the first elongate section 214 includes a first L-beam 232 and the first member end 224 of the second elongate section 222 includes a second L-beam 234. The first L-beam 232 and the second L-beam 234 extend parallel with the first bottom side rail 202 and the second bottom side rail 204, respectively, approximately the width of the respective elongate section 214 and 222. The first L-beam 232 and the second L-beam 234 can also extend down along a portion or the complete height of the respective elongate section 214 and 222. The first L-beam 232 and the second L-beam 234 can be joined to their respective elongate section (214 and 222) by, for example, the welding techniques discussed herein.

In an additional embodiment, instead of an L-beam each of the first elongate section 214 and the second elongate section 222 can further include a C-beam (also known as "structural channel") that extends parallel with the first bottom side rail 202 and the second bottom side rail 204, respectively, approximately the width of the respective elongate section 214 and 222. The C-beam can extend down the complete height of the respective elongate section 214 and 222 with the flanges of the C-beam extend along the length of the first elongate section 214 and the second elongate section 222 to position the first end and the second end of the "C" (the ends of the flanges) closer to the first member end 116 or 124 than the second member end 118 or 126. In another embodiment, each of the first elongate section 214 and the second elongate section 222 can further include a hollow structural section (e.g., a hollow rectangular tube cross-section or hollow square tube cross-section). For this embodiment, the hollow structural section extends parallel with the first bottom side rail 202 and the second bottom side rail 204, respectively, approximately the width and the height of the respective elongate section 214 and 222. The C-beam and/or the hollow structural section can be joined to their respective elongate section (214 and 222) by, for example, the welding techniques discussed herein.

As illustrated, the L-beam is shown having flanges that are approximately ninety (90) degrees to each other (as measured from the interior surfaces of the beam). Similarly, the C-beam and the hollow structural section can have adjacent flanges and/or adjacent sides that are approximately ninety (90) degrees to each other (as measured from the interior surfaces of the beam or hollow structural section). In an additional embodiment, the angles of the adjacent sides or flanges directly adjacent to the first bottom side rail 202 and the second bottom side rail 204 can be different than 90 degrees. For example, the flanges or sides extending from the surface of either the L-beam, C-beam or hollow structural section that touches the bottom side rail 202 or 204 can form a first angle with a value of 90 to 45 degrees (as measured from the interior surfaces of the beam or hollow structural section) while a second angle has a value of 90 to 135 degrees (as measured from the interior surfaces of the beam or hollow structural section). This latter embodiment allows for the surface of either the L-beam, C-beam or hollow structural section that touches the bottom side rail 202 or 204 to have a "wedge" shape, which can help to isolate and focus the lateral force into a smaller relative area for easier capture and detection by the load cell.

As illustrated, the first hinge 220 joins the first member end 216 of the first elongate section 214 along a first face 236 of the first L-beam 232 to the first bottom side rail 202. Similarly, the second hinge 228 joins the first member end 224 of the second elongate section 222 along a first face 238 of the second L-beam 234 to the second bottom side rail 204. Each of the first L-beam 232 and the second L-beam 234 also have a second face 240-1 and 240-2 that can be used to transfer a lateral force 241-1 to a load cell 242.

FIG. 2 illustrates the load cell 242-1 associated with the first bottom side rail 202. As illustrated, the load cell 242-1 is positioned at least partially within the tubular body of the first bottom side rail 202. A portion of the load cell 242-1 is joined (e.g., welded or bolted) to the first bottom side rail 202 in an area directly adjacent to the first member end 216 of the first elongate section 214. The load cell 242-1 can be located and joined to the first bottom side rail 202 in such a way that the load cell 242-1 can detect distortions in the first bottom side rail 202 from the first lateral force 241-1, as discussed herein, being applied through the first member end of the first elongate section into the first bottom side rail. In one embodiment, the load cell 242-1 is joined to the first bottom side rail 202 directly adjacent the first member end of the first elongate section. In an alternative, only a portion of the load cell 242-1 is joined to the first bottom side rail 202 directly adjacent the first member end of the first elongate section. The load cell 242-1 can be joined directly to the first bottom side rail 202. Alternatively, the first bottom side rail 202 can include a holder on to or into which the load cell 242-1 is mounted to allow it to detect the distortions in the first bottom side rail 202 from the first lateral force 241-1.

In an alternative embodiment, the load cell 242-1 is positioned with at least a portion of the load cell passing through an opening 246 in the first bottom side rail 202. As illustrated in FIG. 2, a sensing portion 244 (e.g., a mass button) of the load cell 242-1 passes through an opening 246 in the first bottom side rail 202. The sensing portion 244 can project past the inner surface 248-1 of the first bottom side rail 202 where it makes contact with the second face 240-1 of the first L-beam 232. In that way, the second face 240-1 of the first L-beam 232 transfers the first lateral force 241-1 to the load cell associated with at least the first bottom side rail.

The load cell 242-1 can be a strain gauge load cell that includes a transducer that creates an electrical signal that is proportional to the force being measured. The electrical signal from the load cell 242-1 can be calibrated and standardized to a variety of different predetermined weight values (e.g., standardized weight values) that could be present due to a mass on the floor of the intermodal freight container. The load cell 242-1 can have a number of different shapes and configurations. Examples include, but are not limited to, a shear beam configuration, a compression load cell or an S-type load cell, among others. In one embodiment, the compression load cell or the S-type load cell can be mounted inside the first side beam 202 with the sensing portion 244 of the load cell 242-1 passing through the opening 246 in the first side beam 202.

FIG. 2 also provides a cross-sectional view of a container floor 250 positioned over the jointed member 212, which allows force 252 from a weight of a mass 254 on the container floor 250 having the jointed member 212 in the first predetermined state to be transferred through the third hinge (not shown), the first hinge 220 and the second hinge 228 into the first lateral force 241-1, relative the force 252 from the weight of the mass 254. As discussed herein, the first lateral force 241-1 passes through the first member end 216 of the first elongate section 214 into the first bottom side rail 202 and the load cell 242-1. The load cell 242-1 provides an electrical signal whose magnitude is representative of the first lateral 242-1 force being imparted by the weight of the mass. As illustrated in FIG. 1, the first cross-member and the second cross-member help to hold the first bottom side rail and the second bottom side rail of the intermodal freight container in static equilibrium against the first lateral force 241-1 being imparted by the weight of the mass.

The scale of the present disclosure also includes a controller that includes, among other things, microprocessor 256 having memory 258, where the memory 258 includes instructions stored in the memory 258 and executable by the microprocessor 256. The scale also includes a power source 260 for the operation of the microprocessor 256 and the load cell 242. The load cell 242 is electrically coupled to the power source 260 and the microprocessor 256, where the microprocessor 256 receives and stores in memory 258 the electrical signals from the load cell indicating the weight of the mass inside of the intermodal freight container.

FIG. 2 also illustrates an additional embodiment in which the scale further includes a second load cell 242-2 associated with the second bottom side rail 204. As described for the load cell 242-1 associated with the first bottom side rail 202, force from the weight of the mass 254 on the container floor 250 having the jointed member in the first predetermined state is transferred through the third hinge (not shown), the first hinge 220 and the second hinge 228 into a second lateral force 241-2, relative the force 252 from the weight of the mass 254. The second lateral force 241-2 passes through the second member end 224 of the second elongate section 22 into the second bottom side rail 204. The second load cell 242-2 provides an electrical signal whose magnitude is representative of the second lateral force 242-2 being imparted by the weight of the mass 254. As discussed herein, the first cross-member and the second cross-member help to hold the first bottom side rail 202 and the second bottom side rail 204 of the intermodal freight container in static equilibrium against the second lateral force 241-2 being imparted by the weight of the mass 254. The power source 260 allows for the operation of the microprocessor 256 and the second load cell 242-2. The microprocessor 256 receives and stores in memory 258 the electrical signal from the second load cell 242-2 indicating the weight of the mass inside of the intermodal freight container. The weight information in the memory 258 can then be transmitted to a computing device (e.g., seen in FIG. 12), as discussed herein.

As illustrated in FIG. 2, more than one load cell 242 can be used in measuring the weight of the mass inside the intermodal freight container. As discussed herein, the scale of the present disclosure can have one or more of the jointed member. In turn, one or two load cells can be associated with each of the joined member. This allows for a situation where the scale can include multiple (e.g., three or more) load cells located at different positions along the length of the intermodal freight container. The two or more load cells can be electronically interconnected to sum the readings to give the total weight of the mass on the container floor. In addition, readings can be taken from an individual load cell or combinations of two or more of the load cells to provide a weight measurement of a mass from different portions (e.g., weighing zones) of the container floor.

In addition to the location of the load cell seen in FIG. 2, other locations for one or more of the load cell are possible. For example, in the embodiment where the container floor touches the upper surface 169 of the first elongate section 114 and the second elongate section 122 it would be possible to position one or more load cells between the upper surface 163 of one or more of the cross-member 108 and the bottom surface of the container flooring 250. In this embodiment, as the first elongate section 114 and the second elongate section 122 of the jointed member 102 deflect under the weight of a mass the container floor can, with sufficient mass pressing down on the container floor, contact the load cell between the upper surface 163 of one or more of the cross-member 108 and the bottom surface of the container flooring 250. Such load cells could be mounted to the bottom surface of the container flooring 250 with the sensing portion 244 of the load cell facing and contacting the upper surface 163 of one or more of the cross-member 108 when sufficient mass is present on the container floor 250. Each of the load cells used with the scale of the present disclosure are electrically connected to the microprocessor 256 and memory 258 of the controller in addition to the power source 260.

Figure 3B:
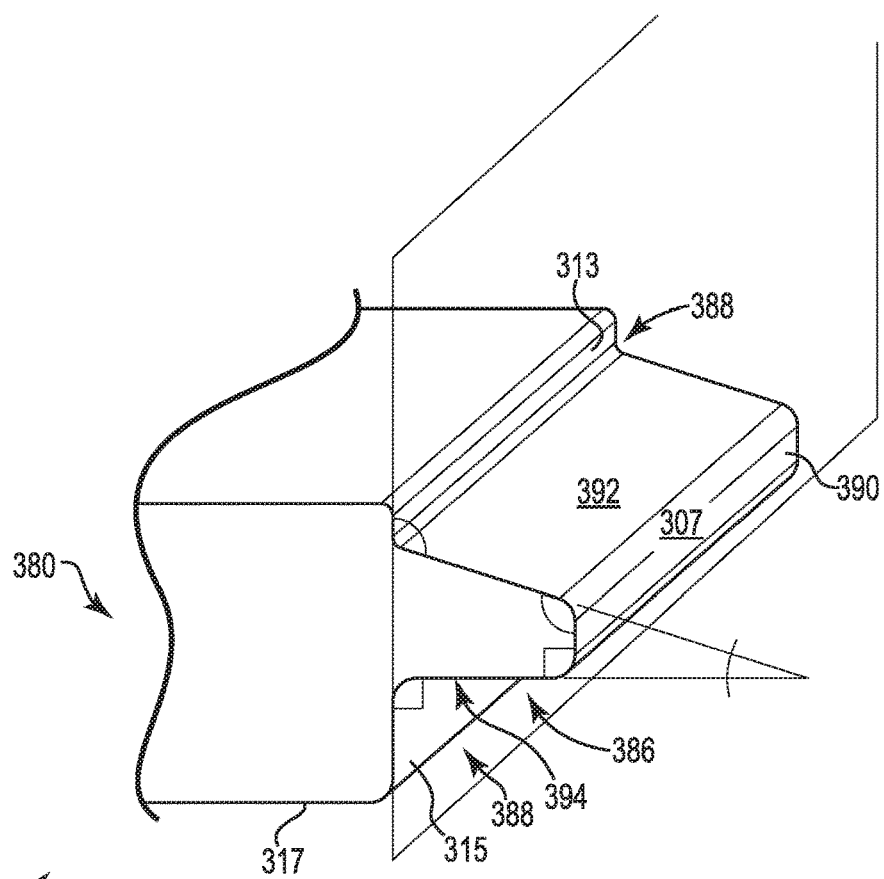

Referring now to FIGS. 3A-3D, there is shown an embodiment of the third hinge 330, which is shown in an exploded view (FIG. 3A). As illustrated, the third hinge 330 is jointed to the first elongate section 314 and the second elongate section 322. As noted herein, each of the first elongate section 314 and the second elongate section 322 can have a length that is equal. Alternatively, one of the first elongate section 314 and the second elongate section 322 can be longer than the other elongate section.

In one or more embodiments, each of the first elongate section 314 and the second elongate section 322 has an obround opening 362 through each of the first elongate section 314 and the second elongate section 322. As discussed herein, an obround opening, such as 362 among the others discussed herein, can have an obround shape or a double "D" shape. Obround is defined as consisting of two semicircles connected by parallel lines tangent to their end points. Double D is defined as consisting of two arcs connected by parallel lines tangent to their endpoints. As used herein, an obround or double D shape does not include a circular shape.

As illustrated, the first elongate section 314 has a first surface 364 defining a first obround opening 366 through the first elongate section 314, and the second elongate section 322 has a second surface 368 defining a second obround opening 370 through the second elongate section 322. As illustrated, each of the surfaces 364 and 368 has a first end 372 (marked as 372-A for the first obround opening 366, and marked as 372-B for the second obround opening 370) and a second end 374 (marked as 374-A for the first obround opening 366, and marked as 374-B for the second obround opening 370), where the second end 374 is opposite the first end 372 along a longitudinal axis 376 of each of the first obround opening 366 and the second obround opening 370.

The third hinge 330 also includes the fastener 378, a portion of which passes through the first and second obround opening 366 and 370 to connect the first elongate section 314 and the second elongate section 322. As will be discussed more fully herein, the fastener 378 passes through the first obround opening 366 and the second obround opening 370. The fastener 378 is secured in position to help hold the first elongate section 314 and the second elongate section 322 together (e.g., the fastener 378 mechanically joins the first elongate section 314 and the second elongate section 322).

While the fastener 378 mechanically joins the first elongate section 314 and the second elongate section 322, the first elongate section 314 and the second elongate section 322 are also able to slide relative to each other and to rotate about the fastener 378. This ability of the first elongate section 314 and the second elongate section 322 to slide relative each other allows for a change in the length of the hypotenuse as the third hinge 330 folds, thereby preventing damage to the jointed member, associated hinges and structures, as discussed herein. This ability to both slide relative each other and to rotate about the fastener 378 provides at least two of the features that allow the third hinge 330 to overcome what is referred to as the hypotenuse issue as discussed in WO 2013/025663, which is incorporated herein by reference in its entirety. This aspect of the invention will be discussed more fully herein.

The use of a variety of fastener 378 is possible. For example, the fastener 378 can be in the form of a bolt with nut (as illustrated) or a rivet. The bolt can have a threaded portion at or adjacent a first end for receiving a nut and a head at a second end opposite the first end. The nut and the head of the bolt can have a diameter relative the first obround opening 366 and the second obround opening 370 that prevents either from passing through the openings 366 and 370 (e.g., only the body of the bolt passes through the openings 366 and 370). A washer can also be used between the head and nut of the bolt to help prevent either from passing through the openings 366 and 370.

Examples of bolts can include, but are not limited to, structural bolts, hex bolts, or carriage bolts, among others. The nut used with the bolt can be a locknut, castellated nut, a slotted nut, a distorted thread locknut, an interfering thread nut, or a split beam nut, among others. A jam nut can also be used with the nut if desired. Examples of a rivet include a solid rivet having a shaft that can pass through and a head that does not pass through the openings 366 and 370. A shop head can then be formed on the rivet that fastens the first elongate section 314 and the second elongate section 322. Regardless of which fastener is used, however, the fastener 378 is not tightened so much as to prevent the first elongate section 314 and the second elongate section 322 of the jointed member 312 from sliding relative to each other and rotating about the fastener 378.

As discussed herein, the fastener 378 passes through the first obround opening 366 and the second obround opening 370 to connect the first elongate section 314 and the second elongate section 322. The first surface 364 defining the first obround opening 366 and the second surface 368 defining the second obround opening 370 each include the first end 372 and the second end 374 opposite the first end 372. The first end 372 and the second end 374 are each in the shape of an arc that helps the surfaces 364, 368 to form a circular shape when in a first predetermined state (seen in FIG. 4). For other embodiments, the first end 372 and/or the second end 374 may include one or more shapes including but not limited, a polygonal shape, a non-polygonal shape, and combinations thereof. In addition, the first obround opening and the second obround opening, as discussed herein, can be positioned at a number of different locations along a height and/or a width of the first elongate section 314 and the second elongate section 322.

As illustrated in FIG. 3A, the first elongate section 314 further includes a first abutment member 380 opposite the first member end (216 in FIG. 2), and the second elongate section 322 further includes a second abutment member 382 opposite the first member end (224 in FIG. 2). In a first predetermined state (shown in FIG. 4 and discussed herein) the first abutment member 380 and the second abutment 382 are in physical contact. In addition, a portion of the first surface 364 of the first obround opening 366 and a portion of the second surface 368 of the second obround opening 370 are in physical contact with the fastener 378 to transfer the force from the weight of the mass on the container floor having the jointed member in the first predetermined state through the first hinge, the second hinge and the fastener 378 of the third hinge 330 into the first lateral force.

Figure 3C:
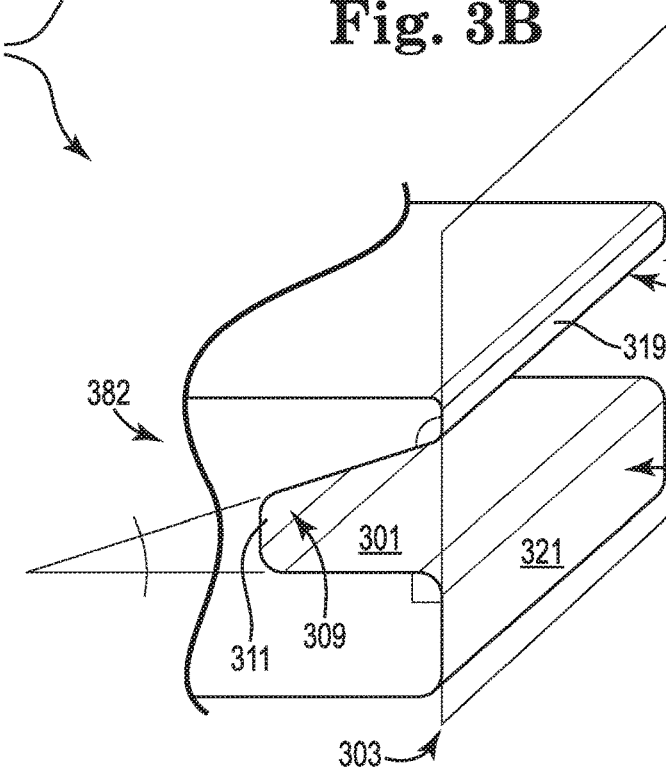
Figure 3D:
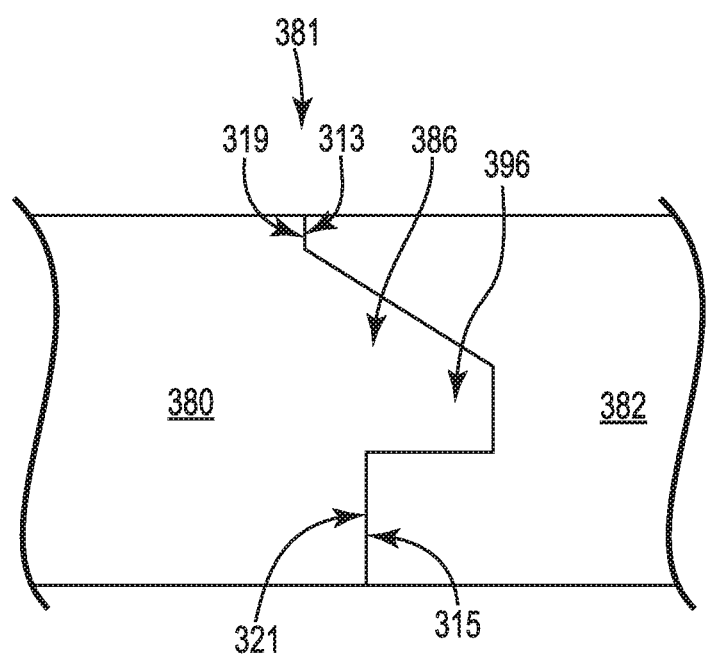

The second end 318 of the first elongate section 314 includes the first abutment member 380 and the second end 382 of the second elongate section 322 includes the second abutment member 382. Together, the first abutment member 380 and the second abutment member 382 form an abutment joint 381. FIGS. 3B-3D provide an enlarged view of the embodiment of the first abutment member 380 and the second abutment member 382 of the abutment member 381. The first abutment member 380 includes a projection 386 that extends from first abutment member shoulders 388 of the first abutment member 380. The projection 386 has a distal end 390 from which a first surface 392 and a second surface 394 extend towards the first abutment member shoulders 388 at an acute angle. As used herein, an "angle" is the figure formed by two rays that share a common endpoint (e.g., the vertex of the angle). For acute angle, the first surface 392 and the second surface 394 share a common endpoint. As used herein, an "acute angle" is an angle that is less than ninety degrees (less than 90°).

The second abutment member 382 has a socket 396 into which the projection 386 of the first abutment member 380 releasably seats. The socket 396 has a first surface 398 and a second surface 301 that extend away from a first end 303 of the second abutment member 382 at an acute angle. The acute angle can be equal to or less than the acute angle of the first surface 392 and the second surface 394 of the first abutment member 380, where the first surface 398 and the second surface 301 share a common endpoint. In one embodiment, the socket 396 having the first surface 398 and the second surface 301 that extend away from the first end 303 of the second abutment member 382 has an acute angle that is equal to the acute angle of the first surface 392 and the second surface 394 of the first abutment member 380.

The second abutment member 382 also includes second abutment member shoulders 305 that extend from the socket 396 such that when the projection 386 of the first abutment member 380 seats in the socket 396 of the second abutment member 382, the second surface 394 of the projection 386 and the second surface 301 of the socket 396 touch, and the second abutment member shoulders 305 and the first abutment member shoulders 388 touch. In one embodiment, when the socket 396 having the first surface 398 and the second surface 301 that extend away from the first end 303 of the second abutment member 382 have an acute angle that is equal to the acute angle of the first surface 392 and the second surface 394 of the first abutment member 380 the projection 386 of the first abutment member 380 can seat in the socket 396 of the second abutment member 382 such that the first surface 392 of the projection 386 and the first surface 398 of the socket 396 touch, the second surface 394 of the projection 386 and the second surface 301 of the socket 396 touch, and the second abutment member shoulders 305 and the first abutment member shoulders 388 touch.

As used herein, to "touch" means to be at least partially in contact (e.g., the second surface 394 of the projection 386 and the second surface 301 of the socket 396 are at least partially in contact when the projection 386 of the first abutment member 380 seats in the socket 396 of the second abutment member 382). As used herein, "seat", "seats" or "seated" means to fit into another part, such as the surfaces of the first abutment member 380 and the second abutment member 382, so at least some of the surfaces of the parts come to rest against each other (e.g., no further relative movement is possible in the direction along which the first abutment member 380 and the second abutment member 382 were traveling as they came to rest against each other).

The distal end 390 of the projection 386 can define a planar surface 307 that forms an obtuse angle with the first surface 392 of the projection at the common end point. The planar surface 307 can also form a ninety degree angle with the second surface 394 of the projection 386 at the common endpoint. The socket 396 of the second abutment member 382 includes a second end 309 having a planar surface 311. In one embodiment, the planar surface 311 can be a mirror image of the planar surface 307 of the distal end 390 of the projection 386. It is appreciated, however, that the distal end 390 of the projection 386 need not be a planar surface as shown in FIG. 3B. For example, the distal end 390 of the projection 386 could have a non-planar configuration such as a rounded configuration, such as a convex surface or a concave surface.

The first abutment member shoulders 388 include a first shoulder surface 313 that extends from the first surface 392 of the projection 386 and a second shoulder surface 315 that extends from the second surface 394 of the projection 386. The second shoulder surface 315 and the second surface 394 of the projection 386 form a ninety degree angle at the common endpoint. As discussed herein, the second shoulder surface 315 and the second surface 394 of the projection 386 can also form an obtuse angle. The first shoulder surface 313 and the first surface 392 of the projection 386 form an obtuse angle at the common endpoint.

The relationship of the size and shape of the projection 386 relative both the first shoulder surface 313 and the second shoulder surface 315, and the socket 396 can also vary. For example, the second shoulder surface 315 can have a height that is from two to four times as large as a height of the first shoulder surface 313. The second shoulder surface 315 can also have a height that is from two to six times as large as a height of the first shoulder surface 313. In one embodiment, the second shoulder surface 315 is three times as large as the height of the first shoulder surface 313 (e.g., the second shoulder surface 315 is "X" millimeters (e.g., 18 mm) high and the first shoulder surface 313 is "3X" millimeters high (e.g., 6 mm)).

There can also be a predetermined relationship between the length of the projection 386, as measured along the second surface 394 of the projection 386 between the second shoulder surface 315 and the planar surface 307 of the first abutment member 380, and the height of the second shoulder surface 315, as measured from the second surface 394 and a bottom surface 317 of the first abutment member 380. For the various embodiments, this predetermined relationship provides that the length of the projection 386, as measured along the second surface 394 of the projection 386 between the second shoulder surface 315 and the planar surface 307 of the projection 386, is equal to or less than the height of the second shoulder surface 315, as measured from the second surface 394 and a bottom surface 317 of the first abutment member 380. So, for example, there can be a one (1) to one (1) ratio of the length of the projection 386, as measured along the second surface 394 between the second shoulder surface 315 and the planar surface 307, to the height of the second shoulder surface 315, as measured from the second surface 394 and a bottom surface 317 of the first abutment member 380. Other ratios of the length of the projection 386, as measured along the second surface 394 between the second shoulder surface 315 and the planar surface 307, to the height of the second shoulder surface 315, as measured from the second surface 394 and a bottom surface 317 of the first abutment member 380, are also possible. Examples of these ratios include, but are not limited to, eight (8) to nine (9); seven (7) to eight (8); six (6) to seven (7); five (5) to six (6); four (4) to five (5); three (3) to four (4); two (2) to three (3); and one (1) to two (2), among others.

As illustrated in FIG. 3B, the first shoulder surface 313 and the second shoulder surface 315 can lay in a common plane. Alternatively, the first shoulder surface 313 and the second shoulder surface 315 do not lie in a common plane. When the first shoulder surface 313 and the second shoulder surface 315 are not in a common plane the two surfaces 313 and 315 can be co-planar to each other. In this configuration, the second shoulder surface 315 would be closer to the distal end 390 of the projection 386 relative the position of the first shoulder surface 313. The second abutment member 382 would complement the alternative shape by shortening the height of the shoulder surface so as to be closer to the height of second end 309 of the socket 396. FIG. 3D provides an illustration of the first shoulder surface 313 and the second shoulder surface 315 being co-planar to each other.

The second abutment member shoulders 305 include a first shoulder surface 319 that extends from the first surface 398 of the socket 396 and a second shoulder surface 321 that extends from the second surface 301 of the socket 396. The second shoulder surface 321 and the second surface 301 of the socket 396 form a ninety degree angle at the common endpoint. The first shoulder surface 319 and the first surface 398 of the socket 396 form an obtuse angle at the common endpoint.

The relationship of the size and shape of the socket 396 can match that of the projection 386 such that the first abutment member shoulders 388 and the second abutment member shoulders 305 touch when the projection 386 seats in the socket 396, as discussed herein. As discussed herein for the projection 386, there can also be a relationship of the size and shape of the socket 396 relative to both the first shoulder surface 319 and the second shoulder surface 321 that can vary. For example, the second shoulder surface 321 can have a height that is from two to four times as large as a height of the first shoulder surface 319. The second shoulder surface 321 can also have a height that is from two to six times as large as a height of the first shoulder surface 319. In one embodiment, the second shoulder surface 321 is three times as large as the height of the first shoulder surface 319 (e.g., the second shoulder surface 321 is "X" millimeters (e.g., 18 mm) high and the first shoulder surface 319 is "3X" millimeters high (e.g., 6 mm)).

There can also be a predetermined relationship between the height of the second shoulder surface 321 and the height of the second shoulder surface 315. Such a predetermined relationship includes that the height of the second shoulder surface 321 is equal to the height of the second shoulder surface 315. There can also be a predetermined relationship between the length of the projection 386 as measured along the second surface 394 and the length of the second surface 301 as measured from the second shoulder surface 321 to the second end 309. Such a predetermined relationship includes that the length of the projection 386 as measured along the second surface 394 can be equal to or shorter than the length of the second surface 301 as measured from the second shoulder surface 321 to the second end 309.

An embodiment where the length of the projection 386 as measured along the second surface 394 is equal to the length of the second surface 301 as measured from the second shoulder surface 321 to the second end 309 is illustrated in FIGS. 3B through 3D.

As illustrated in FIG. 3C, the first shoulder surface 319 and the second shoulder surface 321 can lay in a common plane. Alternatively, the first shoulder surface 319 and the second shoulder surface 321 do not lie in a common plane. When the first shoulder surface 319 and the second shoulder surface 321 are not in a common plane the two surfaces 319 and 321 can be co-planar to each other. FIG. 3D provides an illustration of this embodiment. Regardless of their relationship, the first shoulder surface 313 and the second shoulder surface 315 of the first abutment member 380 and the first shoulder surface 319 and the second shoulder surface 321 of the second abutment member 382 can touch when the projection 386 of the first abutment member 380 is seated in the socket 396 of the second abutment member 382.

The first surface 392, 398 and the second surface 394, 301 of the first abutment member 380 and the second abutment member 382, respectively, can have a variety of different shapes. For example, the first surface 392 and the second surface 394 of the first abutment member 380 and the first surface 398 and the second surface 301 of the second abutment member 382 can each be a planar surface. In an additional embodiment, the first surfaces 392 and 398 can have a curvature (e.g., a non-planar curved surface). It is also possible for the first surfaces 392 and 398 to have two or more planar surfaces. For example, the first surfaces 392 and 398 can have a "V-shaped" pattern, arcuate pattern, or a semi-spherical pattern. Other shapes are also possible.

The second surface 394, 301 of the first abutment member 380 and the second abutment member 382, respectively, are shown in FIGS. 3B-3D as being planar surfaces that are perpendicular to their respective second shoulder surface 315 and 321. For the various embodiments, the second surface 394, 301 of the first abutment member 380 and the second abutment member 382, respectively, can be non-perpendicular to their respective second shoulder surface 315 and second shoulder surface 321.

When the projection 386 of the first abutment member 380 is seated in the socket 396 of the second abutment member 382 the first shoulder surface 313 of the first abutment member 380 touches the first shoulder surface 319 of the second abutment member 382. The second shoulder surface 315 of the first abutment member 380 also touches the second shoulder surface 321 of the second abutment member 382 when the projection 386 of the first abutment member 380 is seated in the socket 396 of the second abutment member 382. This contact of the shoulder surfaces 313, 315, 319 and 321 when the projection 386 of the first abutment member 380 is seated in the socket 396 of the second abutment member 382 helps to redirect shearing forces applied through the projection 386 (e.g., those forces orthogonal to the shoulder surfaces 313, 315, 319 and 321) to be directed at least partially into compressive forces along the longitudinal axes of the first abutment member 380 and the second abutment member 382 (e.g., a redistribution of forces into the mass of the abutment members 380 and 382).

Referring now to FIG. 4, there is illustrated the first elongate section 414 and the second elongate section 422 of the jointed member 412 in the first predetermined state. Specifically, the amount of overlap shown in FIG. 4 for the first predetermined state is approximately the cross sectional area of the portion of the fastener 478, shown from an end view, that passes through the openings 466 and 470. In one embodiment, the area of the overlap is equal to the cross sectional area of the portion of the fastener 478 that passes through the openings 466 and 470. For either embodiment discussed in this paragraph, the first obround opening 466 and the second obround opening 470 when in their first predetermined state also define a shape that corresponds to the cross sectional shape of the portion of the fastener 478 that passes through the openings 466 and 470. As illustrated, the fastener 478 in the first predetermined state has a longitudinal axis that is offset from but parallel with the fixed axis of rotation of the first hinge (220 in FIG. 2) and the fixed axis of rotation of the second hinge (228 in FIG. 2).

In an additional embodiment, it is also possible to position one or more load cells on or within the abutment member 481. In additional embodiment, the projection (e.g., 386) could be configured as a shear beam type load cell, where a strain gauge could be integrated into the projection to allow for the force of the mass to be sensed by deformations in the abutment member 381. Other parts of the abutment member 381 could also be used a shear beam in a load cell.

FIG. 5 illustrates an exploded view of an intermodal freight container 525 according to the present disclosure. The intermodal freight container 525 includes a floor structure 527, a roof structure 529 opposite the floor structure 527, a first sidewall structure 531-1 and a second sidewall structure 531-2, where both the first sidewall structure 531-1 and the second sidewall structure 531-2 join the floor structure 327 and the roof structure 529. Each of the sidewall structures 531-1 and 531-2 has an exterior surface and an interior surface, where the interior surface of the sidewall structures 531-1 and 531-2, the floor structure 527 and the roof structure 529 at least partially defines a volume of the intermodal freight container 525.

The first sidewall structure 531-1 includes a first sidewall panel that is joined to a first upper side rail 533-1 and the first bottom side rail 502. The second sidewall structure 531-2 includes a second sidewall panel that is joined to a second upper side rail 533-2 and the second bottom side rail 504. The floor structure 327 includes container flooring 550 that is attached to at least the jointed members 512 according to the present disclosure, where a portion of the container flooring 560 has been removed to show the jointed members 512 and the cross members 508. The side rails 502 and 504 can further include forklift pockets.

The intermodal freight container 525 further includes a rear wall 535 and a front wall 537. Each of the rear wall 535 and the front wall 537 include an end frame (e.g., rear end frame 539 and front end frame 541, respectively) joined with the roof structure 529, the floor structure 527 and the sidewall structures 531-1 and 531-2. The end frames 539 and 541 include corner posts 543, corner fittings 545, a header 547 and a sill 549. The corner posts 543 for the rear wall 335 are referred to herein as the rear wall corner posts and for the front wall 537 are referred to herein as the front wall corner posts.

The rear wall 535 includes a door assembly 551. The door assembly 551 can include a door 553 attached to the rear end frame 539 of the rear wall 535 with hinges. The rear end frame 539 includes the header 547, which is also referred to as a rear wall header member for the door assembly 551, and the sill 549, which is also referred to as a rear wall sill member for the door assembly 551. The rear wall corner posts 543 extend between and couple the rear wall sill member 549 and the rear wall header member 547.

FIG. 5 provides an embodiment of the door assembly 551 that includes two of the doors 553, where one of each door 553 is attached by the hinges to one of each of the rear wall corner posts 543. Each door 553 has a height and a width that allows the door 553 to fit within an area defined by the rear wall end frame 539. The door 553 can further include a gasket around a perimeter of the door 553 to help provide weatherproofing on the exterior portion of the rear wall 535.

The door 553 further includes a locking rod 555 having a cam 557 and a handle 559. The locking rod 555 can be mounted to the door 531 with a bearing bracket assembly, where the locking rod 555 turns within and is guided by the bearing bracket assembly to engage and disengage the cam 557 and a cam keeper 561. The cam keeper 561 is mounted on the rear end frame 539. In one embodiment, the cam keeper 561 is mounted on the rear wall header member 547 and the rear wall sill member 549 of the rear end frame 535 of the rear wall 535.

The discussion associated with FIGS. 1-5 of the present disclosure is directed to traditional intermodal freight containers (e.g., a non-folding intermodal freight container that complies with ISO standards). The scale of the present disclosure can also be used with foldable intermodal freight containers, as are known. Examples of such reversibly foldable intermodal freight containers that can include the scale of the present disclosure include those described in WO 2014/028000 entitled "Abutment Joint" and published on Feb. 20, 2014; WO 2013/025676 entitled "Reversibly foldable intermodal freight container and Method for Positioning Doors of a Container Inside the Volume of the Container" and published Feb. 21, 2013; WO 2013/025667 entitled "Door Assembly for Freight Container" and published Feb. 21, 2013; and WO 2013/025663 entitled "Jointed Member" and published Feb. 21, 2013, each of which is incorporated herein by reference in their entirety. The inventive embodiments provided herein are directed to and useful with reversibly foldable intermodal freight containers, such as those referenced and incorporated herein.

Figure 6A:
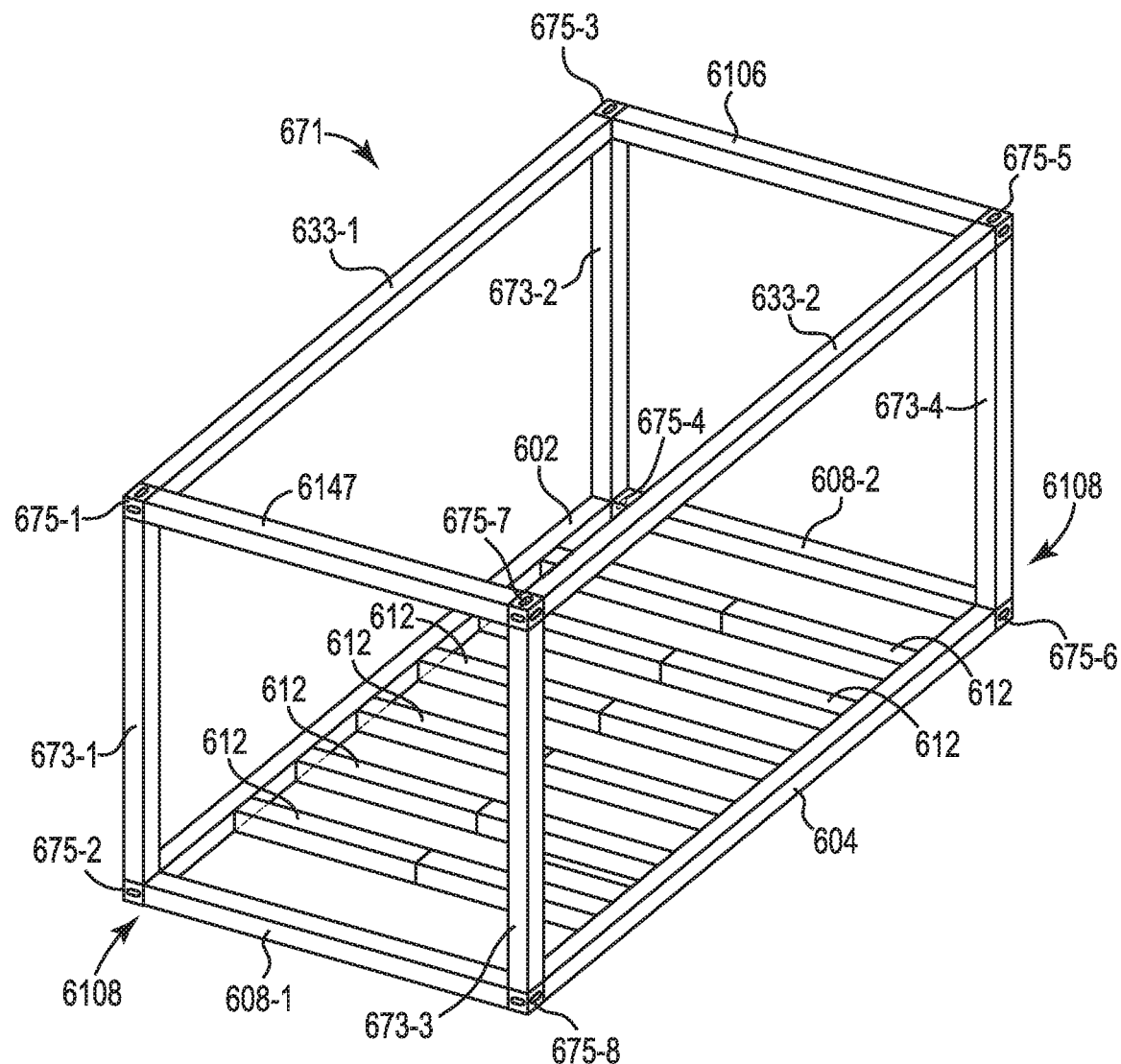
FIGS. 6A-6B illustrate a perspective view of a reversibly foldable intermodal freight container that includes the scale of the present disclosure, where portions of the reversibly foldable intermodal freight container have been removed to show detail.
Figure 6B:
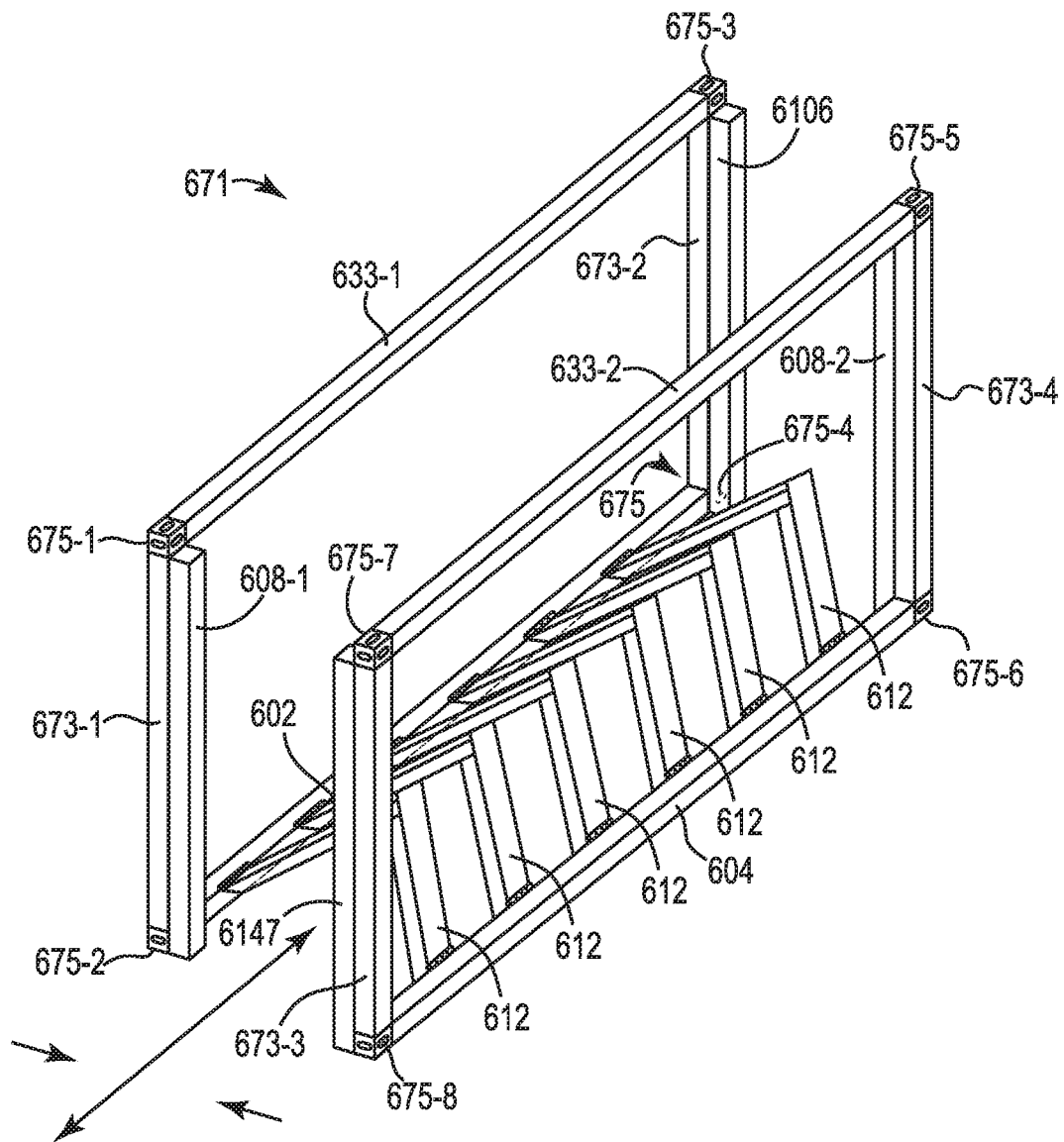

Referring now to FIGS. 6A and 6B, there is illustrated an embodiment of a reversibly foldable intermodal freight container 671, in partial view, that includes the scale of the present invention. The reversibly foldable intermodal freight container 671. In FIGS. 6A and 6B portions of the reversibly foldable intermodal freight container 671 have been removed (e.g., portions of the roof structure, portions of the sidewall structures, portions of the floor structure, portions of the front wall and rear wall, portions of the door assembly, etc.) to allow the location and relative position of the jointed members 612, the first cross-member 608, the second cross-member 610 of the reversibly foldable intermodal freight container 671 to be more clearly seen. The reversibly foldable intermodal freight container 671 illustrated in FIG. 6A is shown in an unfolded state.

As illustrated in FIG. 6A, the reversibly foldable intermodal freight container 671 includes a first corner post 673-1, a second corner post 673-2, a third corner post 673-3, and a fourth corner post 673-4. The corner posts 673-1 through 673-4 are load bearing vertical support members that are both rigid and unfoldable. In addition, the corner posts 673-1 through 673-4 are of sufficient strength to support the weight of a number of other fully loaded freight containers stacked upon the reversibly foldable intermodal freight container 671. Each of the corner posts 673-1 through 673-4 includes a corner fitting 675 (675-1 through 675-8). The corner fittings 675-1 through 675-8 may be employed for griping, moving, placing, and/or securing the reversibly foldable intermodal freight container 671. In one embodiment, the corner posts 673-1 through 673-4 and the corner fittings 675-1 through 675-8 comply with the ISO standards for freight containers, such as ISO standard 688 and ISO standard 1496 (and the amendments to ISO standard 1496), among others. In the unfolded state a predefined maximum width 677 of the reversibly foldable intermodal freight container 671 is eight (8) feet (measured from the corner fittings) as provided in ISO 668 Fifth Edition 1995-12-15.

The reversibly foldable intermodal freight container 671 also includes a first bottom side rail 602 and a second bottom side rail 604. The first bottom side rail 602 and the second bottom side rail 604 are as discussed above for FIGS. 1, 2 and 5. As illustrated, the first bottom side rail 602 is located between the first corner post 673-1 and the second corner post 673-2, and the second bottom side rail 604 is located between the third corner post 673-3 and the fourth corner post 673-4. The reversibly foldable intermodal freight container 671 further includes a first upper side rail 633-1 and a second upper side rail 633-2. The first upper side rail 633-1 may be located between the first corner post 673-1 and the second corner post 673-2. The second upper side rail 633-2 may be located between the third corner post 673-3 and the fourth corner post 673-4.

The reversibly foldable intermodal freight container 671 further includes jointed members 612 according to the present disclosure. The jointed member 612 is as discussed above for FIGS. 1-4 discussed above, where the third hinge 730 is as illustrated and discussed with respect to FIG. 3A-3D. As illustrated, the first and second bottom side rails 602 and 604 are joined by two or more of the jointed members 612. The jointed member 612 acts as a "cross member" in the reversibly foldable intermodal freight container 671 when the reversibly foldable intermodal freight container 671 is in an unfolded state. Functioning as a cross member, the jointed member 612 acts as a beam to help carry a structural load placed on a floor structure of the reversibly foldable intermodal freight container 671. To this end, the joined member 612 of the present disclosure can help carry a structural load as prescribed in ISO standard 1496. Unlike a typical cross member, however, the joined member 612 of the present disclosure can then be used to help the reversibly foldable intermodal freight container 671 to reversibly fold in a lateral direction, relative a longitudinal direction 606 of the upper and bottom side rails.

FIG. 6A also illustrates an embodiment of the cross-members 608 for the present disclosure. As illustrated, the cross-members 608 are located in the end frames of the front wall and the rear wall of the reversibly foldable intermodal freight container 671. Unlike the cross-members seen in FIG. 1-5 for the non-foldable intermodal freight container (where the each of the first cross-member and the second cross-member were not joined to a hinge or form a part of a hinge with the first bottom side rail and the second bottom side rail, respectively, of the intermodal freight container), the first cross-member 608-1 and the second cross-member 608-2 of the present embodiment are joined to a hinge 6108 or form a part of a hinge 6108 with the first bottom side rail and the second bottom side rail, respectively, of the intermodal freight container. A more detailed discussion of the hinge 6108 is provided herein.

Referring now to FIG. 6B, there is shown the reversibly foldable intermodal freight container 671 in at least a partially folded state. As illustrated in FIG. 6B, the jointed member 612 of the reversibly foldable intermodal freight container 671 folds into a volume defined by the reversibly foldable intermodal freight container 671. As the jointed member 612 folds, the corner posts 673-1 through 673-4 and the corner fittings 675-1 through 675-8 are drawn closer together laterally. Once again, this reduction in the volume and the "foot-print" (e.g., area) of the reversibly foldable intermodal freight container 671 from an unfolded state (e.g. FIG. 6A) can be accomplished, as least in part, due to the presence of the jointed members 612.

FIG. 6B also illustrates the embodiment in which the first cross-member 608-1, the second cross-member 608-2 and the header members 6106 and 6147 have been folded to lay parallel with the corner posts 673-1, 673-4, 673-2 and 673-3, respectively. This aspect of the present disclosure is more fully discussed below.

As discussed more fully herein, one major obstacle overcome by the joined member 612 of the present disclosure is its ability to not only act as a structural member or beam capable of helping to support a load as prescribed in ISO standard 1496 when in an unfolded state, but also its surprising ability to transition to a folded state without having any portion of the jointed member 612 extending beyond its defined maximum length as defined in an unfolded state. This defined maximum length of the jointed member 612 can be the defined maximum length of the jointed member in an unfolded state. So, the jointed member of the present disclosure can transition from an unfolded state to a folded state without causing any portion of the jointed member (e.g., the ends of the joined member that help define the defined maximum length) to extend beyond its defined maximum length. As a result, the reversibly foldable intermodal freight container can transition from the unfolded state towards the folded state without any portion of the reversibly foldable intermodal freight container extending beyond its predefined maximum width 677 measured at a predetermined point on each of two of the rear wall corner posts 673. The predetermined point on each of the rear corner posts 673 can be the corner fittings 675 (e.g., maximum width as measured between the outer surface of corner fittings 675-4 and 675-2). This issue is presented as follows.

As discussed herein, the jointed member is configured in such a way that during the folding process the length of the jointed member does not exceed the maximum width of the reversibly foldable intermodal freight container 671 thereby preventing damage to the jointed member, associated hinges and structures. From the folded state the reversibly foldable intermodal freight container may transition back to the unfolded state, and is thus reversibly foldable.

As used in the reversibly foldable intermodal freight container 671, the jointed member 612 can act as a beam. As used herein, a beam is a structural element that is capable of withstanding a load primarily by resisting bending. For various embodiments, the joined member 612 can be configured as a beam, or as part of a beam, for the reversibly foldable intermodal freight container 671. In addition to acting as a beam, however, the joined member 612 of the present disclosure also allows for the reversibly foldable intermodal freight container 671 to fold. When in a folded state, the reversibly foldable intermodal freight container occupies a volume that is less than that of the reversibly foldable intermodal freight container in an unfolded state. So, when in the folded state the structure occupies a volume and/or an area that is less than that of the structure in an unfolded state.

Another significant advantage of the jointed member 612 used in the reversibly foldable intermodal freight container 671 of the present disclosure is its surprising ability to fold within a defined maximum length of the jointed member. (e.g., the defined maximum length can be a maximum length of the jointed member). This defined maximum length of the jointed member 612 can be the defined maximum length of the jointed member 612 in an unfolded state. So, the jointed member of the present disclosure can transition from an unfolded state to a folded state without causing any portion of the jointed member 612 (e.g., the ends of the joined member that help define the defined maximum length) to extend beyond its defined maximum length. The following discussion will help to further clarify the problem that the jointed member of the present disclosure has helped to overcome.

Referring now to FIGS. 7A-7E there is shown the jointed member 712 transitioning from the first predetermined state towards the second predetermined state without any portion of the jointed member 712 extending beyond its defined maximum length. During this transition the first obround opening, the second obround opening, and the fastener can move relative each other as does the first abutment member 780 and the second abutment member 782. This relative movement helps to provide that the jointed member 712 transitions from the first predetermined state towards the second predetermined state (e.g., a folded state) without expanding beyond either the defined maximum length or the predefined maximum width of the reversibly foldable intermodal freight container (e.g., 8 feet) provided in the first predetermined state, while neither bowing or damaging the jointed member, a pivotal connection (e.g., a hinge) or a structure of the reversibly foldable intermodal freight container.

The jointed member 712 can fold in a way that the components of the reversibly foldable intermodal freight container do not extend beyond their predefined maximum width (e.g., ISO standard width of 8 feet). The joined member 712 has the attributes of a compound hinge. Specifically, the joined member 712 has two distinct and separate axes of rotation that are used during the folding and/or the un-folding of the jointed member 712.

Figure 7A:
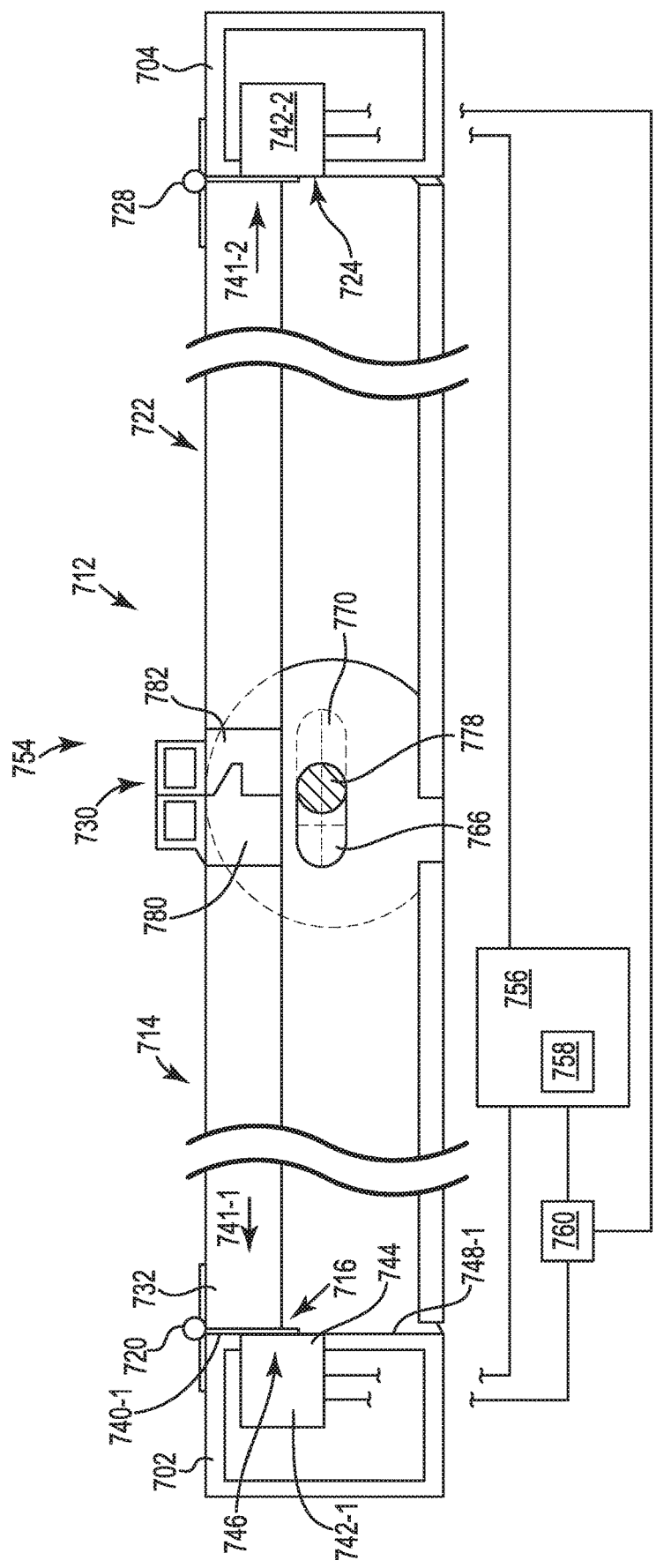
Figure 7B:
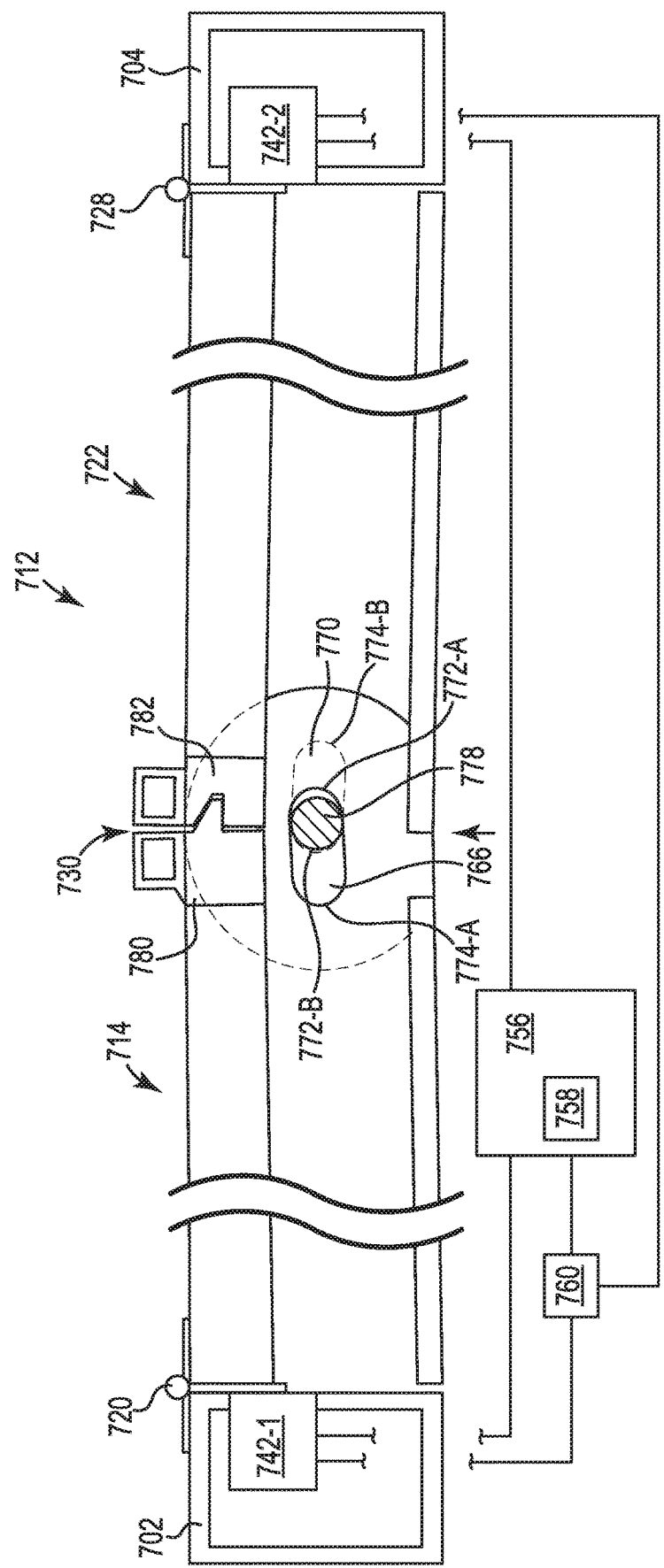
Figure 7C:
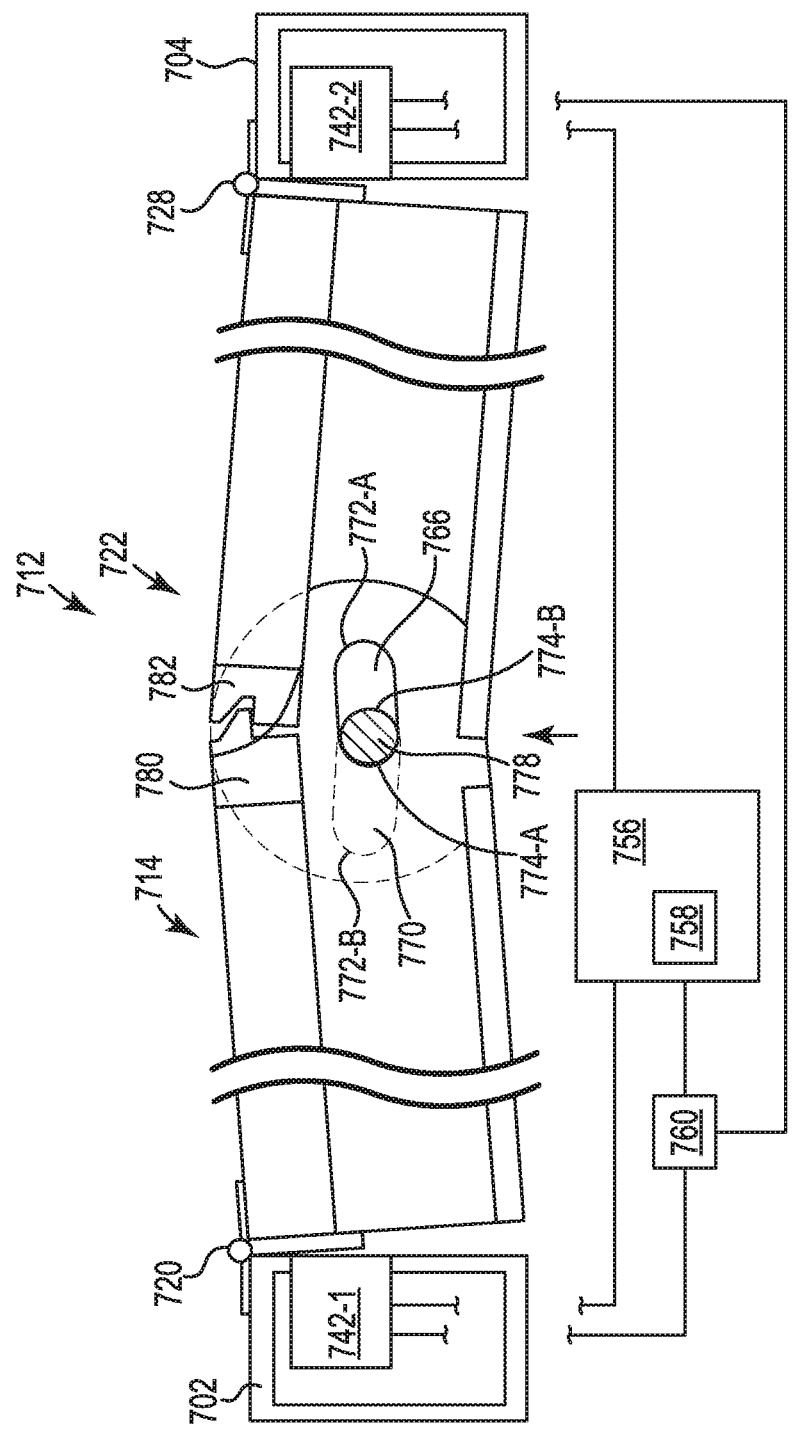

FIGS. 7A-7C illustrate the first elongate section 714 connected to the first bottom side rail 702 by the first hinge 720 and the second elongate section 722 connected to a second bottom side rail 704 by the second hinge 728. FIGS. 7A-7C also illustrates the embodiment of the third hinge 730 that includes the fastener 778 that joins the first elongate section 714 and the second elongate section 722 by passing through the first and second obround opening 766 and 770, respectively. The fastener 778 is shown in cross-section in FIG. 7A-7C to better illustrate its relationship to the first and second obround opening 766 and 770 as the jointed member 712 moves from the first predetermined, or unfolded, position towards the second predetermined, or the folded position.

Figure 8:
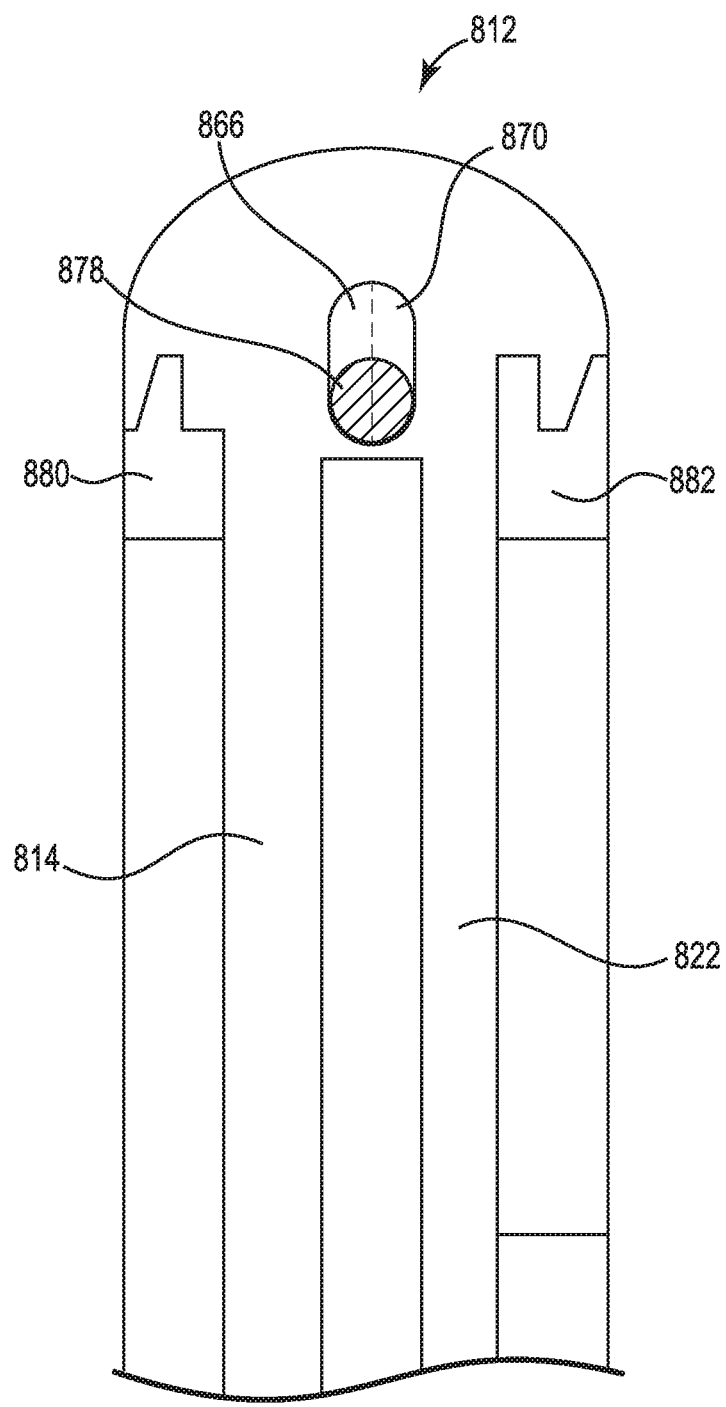
FIG. 8 is a side view of the jointed member in the second predetermined state, according to an embodiment of the present disclosure.

In FIG. 7A the jointed member 712 is shown in its first predetermined state having its defined maximum length. In this first predetermined state: the first and second abutment members 780 and 782 are in contact; the overlap of the first and second obround openings 766 and 770 is at a minimum relative the second predetermined state (seen in FIG. 8). As the jointed member 712 begins to fold different portions of the jointed member 712 move so as to rotate around predefined points of rotation (e.g., a first axis of rotation), to slide relative one or more of the other parts of the jointed member 712 and/or to shift relative positions at different stages of the folding process. Referring now to FIG. 7B, the jointed member 712 is shown beginning to fold from its first predetermined state, as seen in FIG. 7A, towards the second predetermined state, as seen in FIG. 8. As illustrated in FIG. 7B, the first abutment member 780 and the second abutment member 782 define a first point of rotation around a first axis of rotation for the first elongate section 714 and the second elongate section 722. In other words, the first point of rotation around which the first elongate section 714 and the second elongate section 722 rotate is defined at the point of contact between the first abutment member 780 and the second abutment member 782.

As the first elongate section 714 and the second elongate section 722 rotate around the first point of rotation defined by the first abutment member 780 and the second abutment member 782 the surfaces defining the first obround opening 766 and the second obround opening 770 move relative each other. The fastener 778 can also move (e.g., laterally) within the first obround opening 766 and/or the second obround opening 770 as the jointed member 712 transitions from the first predetermined state towards the second predetermined state. In transitioning towards the second predetermined state the fastener 778 is mobile within the first obround opening 766 and/or the second obround opening 770. As discussed herein, the axial center of the fastener 778 moves along (e.g., essentially parallel with) the longitudinal axis of the first obround opening 766 and the second obround opening 770 as the jointed member 712 transitions from a first predetermined state to a second predetermined state. The cross-sectional shape of the fastener 778 is of a size and a shape that allows the fastener 778 to travel along the longitudinal axis (e.g., the longest diameter through the center of the obround opening) of the first obround opening 766 and the second obround opening 770 as the jointed member 712 transitions from a first predetermined state to a second predetermined state without any significant amount of travel along the minor axis (e.g., the shortest diameter through the center of the obround opening) of the first obround opening 766 and the second obround opening 770. So, for example, the distance between the parallel lines tangent to the end points of the two semicircles of the first and second obround openings 766 and 770 is approximately the diameter of the portion of the fastener 778, illustrated herein, that passes through the first and second obround openings 766 and 770.

As illustrated in FIG. 7B, the fastener 778 has moved laterally (e.g. in a direction coincident with the longitudinal axis) within the first obround opening 766. Likewise, the fastener 778 may move laterally within the second obround opening 770 (e.g. in a direction coincident with the longitudinal axis).

FIG. 7B shows how a gap develops between the fastener 778 and the first end 772 of the surfaces defining the first obround opening 766 (772-A) and the second obround opening 770 (772-B). The jointed member 712 can rotate around a point of contact (e.g., a predetermined point of contact) between the first abutment member 780 and the second abutment member 782 until the second ends 774 of the first obround opening 766 (774-A) and the second obround opening 770 (774-B) contact the fastener 778, for example. This embodiment, where the second ends 774 of the first obround opening 766 (774-A) and the second obround opening 770 (774-B) contact the fastener 778, is illustrated in FIG. 7C. FIG. 7C also illustrates that the point of rotation now shifts from the first point of rotation, defined by the first abutment member 780 and the second abutment member 782, to a second point of rotation on a second axis of rotation that is formed by the second end 774 of both the first surface of the first obround opening 766 (774-A) and the second surface of the second obround opening 770 (774-B) when positioned against the fastener 778. This second point of rotation around a second axis of rotation for the first abutment member 780 and the second abutment member 782 is different than the first point of rotation discussed herein.

As illustrated in FIGS. 7A-7C, the first elongate section 714 and the second elongate section 722 rotate around (e.g., turn on) the first point of rotation prior to rotating around (e.g., turning on) the second point of rotation as the jointed member 712 transitions from the first predetermined state towards the second predetermined state. Also, as illustrated in FIG. 7C the first end 772-A, 772-B of each of the first obround opening 766 and the second obround opening 770, respectively, does not contact the fastener 778 when the second end 774-A and 774-B of each of the first obround opening 766 and the second obround opening 370, respectively, are seated against the fastener 778.

As seen in FIGS. 7A-7C, as the first elongate section 714 and the second elongate section 722 rotate around (e.g., turn on) the first point of rotation the first abutment member 780 and the second abutment member 782 can initially separate, or move, from their seated position along the longitudinal axis. As this happens, the first gap is formed between the distal end of the projection 786 and the second end of the socket 796 of the second abutment member 782. The second gap also forms between the first surface of the projection 786 and the first surface of the socket 796. This combination of the first gap and the second gap for the given configuration of the abutment joint 781 allows for the first abutment member 780 and the second abutment member 782 to travel along the arcuate travel path as the jointed member 712 rotates around the second point of rotation.

In shifting from the first point of rotation to the second point of rotation the length of the hypotenuse of the jointed member 712 changes from an initial value when the jointed member 712 is in the first predetermined state (as discussed herein) to a shorter value, relative the initial value, such as when the point of rotation shifts to the point of contact between the second end 774 of the first obround opening 766 (774-A) and the second obround opening 770 (774-B) and the fastener 778.

Figure 7D:
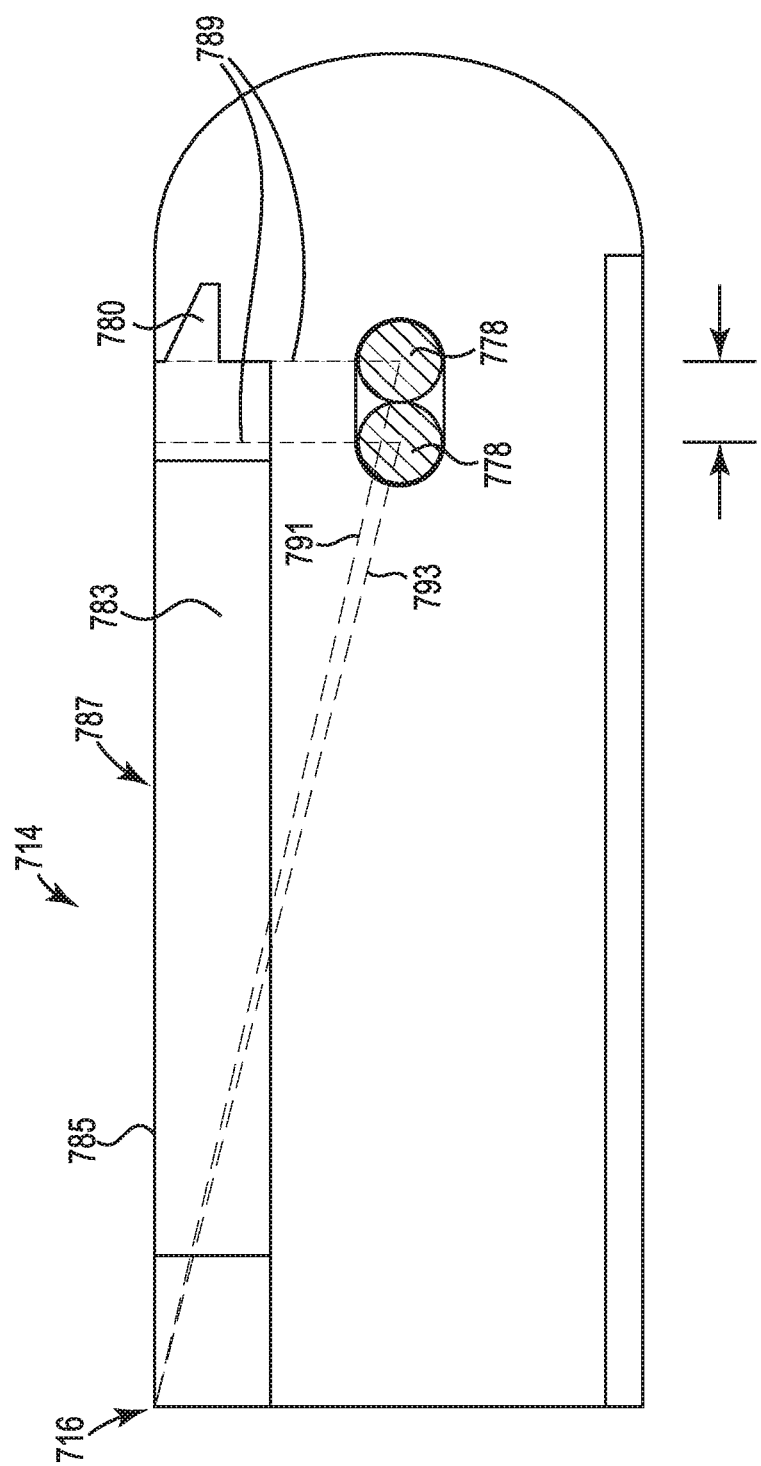

FIGS. 7D and 7E can be used to illustrate this change in the length of the hypotenuse of the jointed member 712. The broken lines 791 and 793 in FIGS. 7D and 7E show the hypotenuse of jointed member 712 when the jointed member is at either the first point of rotation or the second point of rotation. In FIG. 7D, there is shown the first elongate section 714, where in the first predetermined state the fastener 778, the first abutment member 780 and the first end 716, all in a common plane, can define a right triangle 783 of the first elongate section 714. Specifically, the hypotenuse of the right triangle 783 is between the fastener 778 and the first end 716, a first leg 785 of the right triangle 783 is defined by the first end 716 and the perpendicular intersection of a first line 787 extending from the first end 716 and a second line 789 extending from the geometric center of the fastener 778, where the first and second lines 787 and 789 are in the common plane.

As illustrated in FIG. 7D, when in the first predetermined state broken line 791 shows the hypotenuse of jointed member 712. When the point of rotation shifts to the second point of rotation the broken line 793 shows the now shortened hypotenuse, relative the hypotenuse in the first predetermined state. In addition to being shorter than broken line 791, the hypotenuse shown by broken line 793 can be equal to or shorter than the first leg 785 of the right triangle 783 of the first elongate section 714 when the jointed member is in the first predetermined state. In this way, the jointed member 712 having the now shortened hypotenuse can pass through, for example, the defined maximum length, as discussed herein.

Similarly, in FIG. 7E there is shown the second elongate section 722, where in the first predetermined state the fastener 778, the second abutment member 782 and the first end 724 first end 724 of the second elongate section 722, all in a common plane, define a right triangle 783 of the second elongate section 722. Specifically, the hypotenuse of the right triangle 783 is between the fastener 778 and the first end 724, a first leg 785 of the right triangle 783 is defined by the first end 724 and the perpendicular intersection of a first line 787 extending from the first end 724 and a second line 789 extending from the geometric center of the fastener 778, where the first and second lines 787 and 789 are in the common plane.

As illustrated in FIG. 7E, when in the first predetermined state broken line 791 shows the hypotenuse of jointed member 712. When the point of rotation shifts to the second point of rotation the broken line 793 shows the now shortened hypotenuse, relative the hypotenuse in the first predetermined state. In addition to being shorter than broken line 791, the hypotenuse shown by broken line 793 can be equal to or shorter than the first leg 785 of the right triangle 783 of the second elongate section 722 when the jointed member is in the first predetermined state. In this way, the jointed member 712 having the now shortened hypotenuse can pass through, for example, the defined maximum length, as discussed herein.

As illustrated in FIGS. 7D and 7E, the first predetermined state the hypotenuse has a length that is greater than a length of the first leg 785. However, as the first abutment member 780 and the second abutment member 782 rotate about the first point of rotation the length of the first leg 785 of the right triangle 783 changes by a length 795, which is the length the geometric center of the fastener 778 travels between the first predetermined state and the second predetermined state. The change in the first leg 785 also changes the length of the hypotenuse so that it is no longer greater than the length of the first leg 785 as measured in the first predetermined position. This change in the effective length of the hypotenuse allows the jointed member 712 to fold towards the second predetermined state without extending beyond the defined maximum length defined in the first predetermined state. For un-folding of the jointed member 712 a force may be applied to the folded jointed member to cause the jointed member 712 to return to its first predetermined state as seen in FIG. 7A. In returning to its first predetermined state the defined maximum length is not exceeded.

The joined member 712 illustrated in FIGS. 7A-7C also include the load cell 742, the controller having, among other things, the microprocessor 756 and memory 758 and power source 760 as was discussed above for FIG. 2. As discussed and illustrated in FIG. 2, the load cell 742-1 is associated with the first bottom side rail 702. As illustrated, the load cell 742-1 is positioned at least partially within the tubular body of the first bottom side rail 702. A portion of the load cell 742-1 is joined (e.g., welded or bolted) to the first bottom side rail 702 in an area directly adjacent to the first member end 716 of the first elongate section 714. The load cell 742-1 can be located and joined to the first bottom side rail 702 in such a way that the load cell 742-1 can detect distortions in the first bottom side rail 702 from the first lateral force 741-1, as discussed herein, being applied through the first member end of the first elongate section into the first bottom side rail. In one embodiment, the load cell 742-1 is joined to the first bottom side rail 702 directly adjacent the first member end of the first elongate section. In an alternative, only a portion of the load cell 742-1 is joined to the first bottom side rail 702 directly adjacent the first member end of the first elongate section. The load cell 742-1 can be joined directly to the first bottom side rail 702. Alternatively, the first bottom side rail 702 can include a holder on to or into which the load cell 742-1 is mounted to allow it to detect the distortions in the first bottom side rail 702 from the first lateral force 741-1.

In an alternative embodiment, the load cell 742-1 is positioned with at least a portion of the load cell passing through an opening 746 in the first bottom side rail 702. As illustrated in FIGS. 7A-7C, a sensing portion 744 (e.g., a mass button) of the load cell 742-1 passes through an opening 746 in the first bottom side rail 702. The sensing portion 744 can project past the inner surface 748-1 of the first bottom side rail 702 where it makes contact with the second face 740-1 of the first L-beam 732. In that way, the second face 740-1 of the first L-beam 732 transfers the first lateral force 741-1 to the load cell associated with at least the first bottom side rail.

The load cell 742-1 can be a strain gauge load cell that includes a transducer that creates an electrical signal that is proportional to the force being measured. The electrical signal from the load cell 742-1 can be calibrated and standardized to a variety of different predetermined weight values (e.g., standardized weight values) that could be present due to a mass on the floor of the intermodal freight container. The load cell 742-1 can have a number of different shapes and configurations. Examples include, but are not limited to, a shear beam configuration, a compression load cell or an S-type load cell, among others. In one embodiment, the compression load cell or the S-type load cell can be mounted inside the first side beam 702 with the sensing portion 744 of the load cell 742-1 passing through the opening 746 in the first side beam 702.

FIGS. 7A-7C also illustrate an additional embodiment in which the scale further includes a second load cell 742-2 associated with the second bottom side rail 704. As described for the load cell 742-1 associated with the first bottom side rail 702, force from the weight of the mass 754 on the container floor having the jointed member in the first predetermined state is transferred through the third hinge 730, the first hinge 720 and the second hinge 728 into a second lateral force 741-2, relative the force from the weight of the mass 754. The second lateral force 741-2 passes through the second member end 724 of the second elongate section 722 into the second bottom side rail 704. The second load cell 742-2 provides an electrical signal whose magnitude is representative of the second lateral force 742-2 being imparted by the weight of the mass 754. As discussed herein, the first cross-member (e.g., 608-1 seen in FIG. 6) and the second cross-member (608-2 seen in FIG. 6) help to hold the first bottom side rail 702 and the second bottom side rail 704 of the intermodal freight container in static equilibrium against the first lateral force 741-1 and the second lateral force 741-2 being imparted by the weight of the mass 754.

More than one load cell 742 can be used in measuring the weight of the mass inside the intermodal freight container.

As illustrated in FIG. 6A, the scale of the present disclosure can have two or more of the jointed members. In turn, one or two load cells can be associated with each of the joined member. This allows for a situation where the scale can include multiple (e.g., three or more) load cells located at different positions along the length of the intermodal freight container. The two or more load cells can be electronically interconnected to sum the readings to give the total weight of the mass on the container floor. In addition, readings can be taken from an individual load cell or combinations of two or more of the load cells to provide a weight measurement of a mass from different portions (e.g., weighing zones) of the container floor.

The microprocessor 756 has memory 758, where the memory 758 includes instructions stored in the memory 758 and executable by the microprocessor 756. The scale also includes a power source 760 for the operation of the microprocessor 756 and the load cell(s) 742. The load cell(s) 742 is(are) electrically coupled to the power source 760 and the microprocessor 756, where the microprocessor 756 receives and stores in memory 758 the electrical signals from the load cell indicating the weight of the mass inside of the intermodal freight container. The weight information in the memory 758 can then be transmitted to a computing device (e.g., seen in FIG. 12), as discussed herein.

Referring now to FIG. 8, there is shown an embodiment of the jointed member 812 in the second predetermined state in which the first obround opening 866 and the second obround opening 870 can have a maximum overlap relative the minimum overlap (e.g., the first predetermined state), as discussed herein. In the embodiment illustrated in FIG. 8 the fastener 878 is free to move along the longitudinal axes of the first obround opening and the second obround opening when the first obround opening and the second obround opening are in the second predetermined state.

In the second predetermined state, FIG. 8 shows the first obround opening 866 completely overlapping the second obround opening 870. While FIG. 8 illustrates a complete overlap of the first obround opening 866 and the second obround opening 870 it is intended that the overlap may be substantially complete, e.g. due to machine tolerances and so forth. This relationship between the first obround opening 866 and second obround opening 870 may be considered the maximum overlap of the first obround opening and the second obround opening relative the minimum overlap, as discussed herein. In other words a value of an area of the maximum overlap cannot be further increased by repositioning either the first elongate section or the second elongate section.

Figure 9:
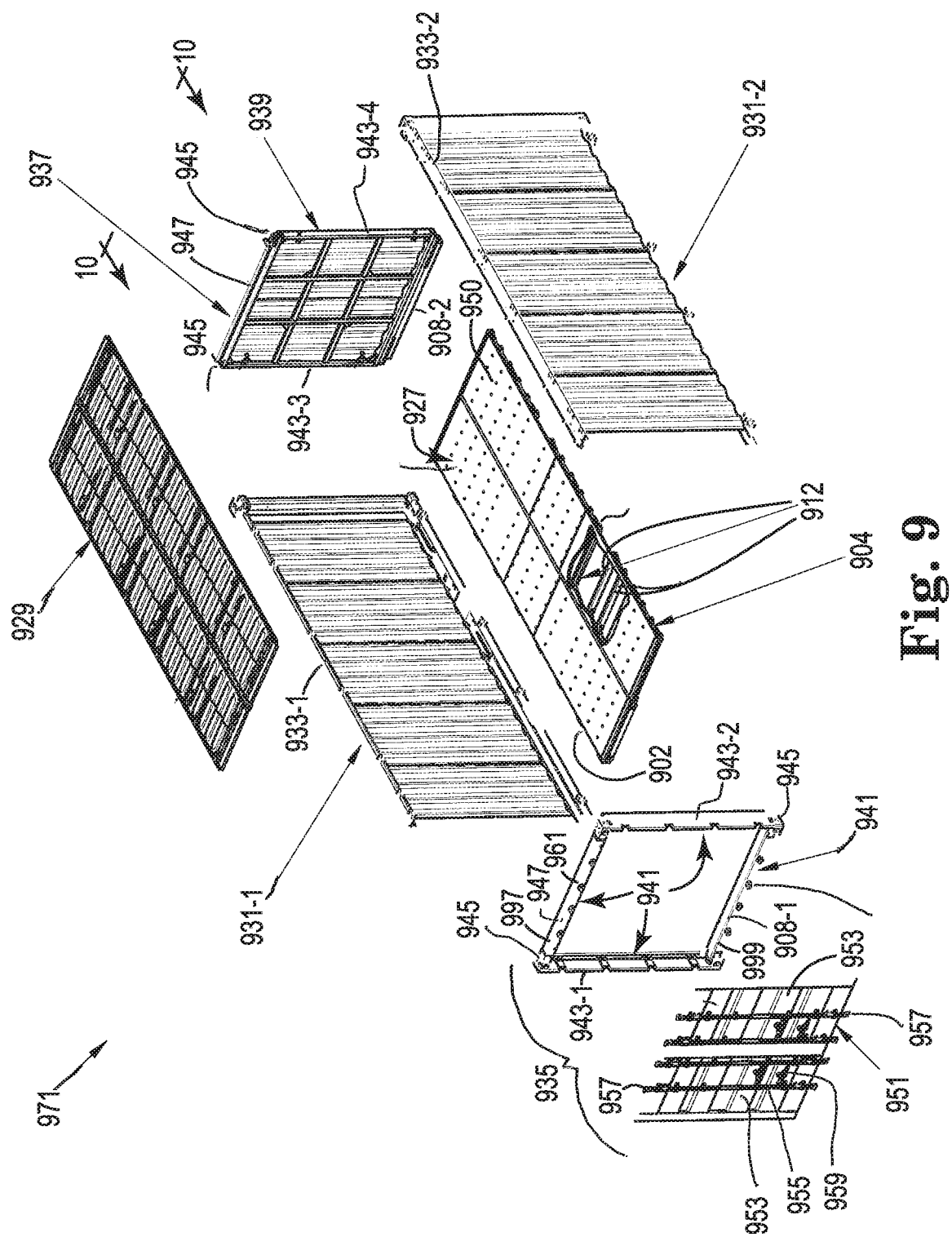
FIG. 9 is an exploded view of a reversibly foldable intermodal freight container that includes the scale of the present disclosure.

FIG. 9 illustrates an exploded view of a reversibly foldable intermodal freight container 971 according to one or more embodiments of the present disclosure. The reversibly foldable intermodal freight container 971 includes a floor structure 927, a roof structure 929 opposite the floor structure 927, a first sidewall structure 931-1 and a second sidewall structure 931-2, where both the first sidewall structure 931-1 and the second sidewall structure 931-2 join the floor structure 927 and the roof structure 929. Each of the sidewall structures 931-1 and 931-2 has an exterior surface and an interior surface, where the interior surface of the sidewall structures 931-1 and 931-2, the floor structure 927 and the roof structure 929 at least partially defines a volume of the reversibly foldable intermodal freight container 971.

The first sidewall structure 931-1 includes a first sidewall panel that is joined to a first upper side rail 933-1 and a first bottom side rail 902. The second sidewall structure 931-2 includes a second sidewall panel that is joined to a second upper side rail 933-2 and the second bottom side rail 904. The floor structure 927 includes container flooring 950 that is attached to jointed members 912 according to the present disclosure, where a portion of the container flooring 927 has been removed to show the jointed members 912. Each of the jointed members 912 is joined to the first bottom side rail 902 and the second bottom side rail 904 as discussed herein. The bottom side rails 902 and 904 can further include forklift pockets.

The reversibly foldable intermodal freight container 971 further includes a rear wall 935 and a front wall 937. Each of the rear wall 935 and the front wall 937 include an end frame joined with the roof structure 929, the floor structure 927 and the sidewall structures 931-1 and 931-2. The end frame includes corner posts 943, corner fittings 945, a header 947 and the cross-member 908. In the present embodiment, the cross-member 908 can also be considered to be the sill of the end frame. The end frame for the rear wall 935 is referred to herein as the rear wall end frame 941 and the end frame for the front wall 937 is referred to herein as the front wall end frame 939. The corner posts 943 for the rear wall 935 are referred to herein as the rear wall corner posts 943-1 and 943-2 and for the front wall 937 are referred to herein as the front wall corner posts 943-3 and 943-4.

The rear wall 935 includes a door assembly 951. The door assembly 951 can include a door 953 attached to the rear wall end frame 941 of the rear wall 935 with hinges, which are discussed in a co-pending application entitled "Door Assembly for Freight Container" (WO 2013/025667), which is incorporated herein by reference in its entirety.

The rear wall end frame 941 includes the header 947, which is also referred to as a rear wall header member 997 for the door assembly 951, and the first cross-member 908-1, which can also be referred to as a rear wall sill member 999 for the door assembly 951. The rear wall corner posts 943-1 and 943-2 extend between and couple the first cross-member 908-1 and the rear wall header member 997.

FIG. 9 provides an embodiment of the door assembly 951 that includes two of the doors 953, where one of each door 953 is attached by the hinges to one of each of the rear wall corner posts 943-1 and 943-2. Each door 953 has a height and a width that allows the door 953 to fit within an area defined by the rear wall end frame 941. The door 953 can further include a gasket around a perimeter of the door 953 to help provide weatherproofing on the exterior portion of the rear wall 935. The door 953 further includes a locking rod 955 having a cam 957 and a handle 959. The locking rod 955 can be mounted to the door 953 with a bearing bracket assembly, where the locking rod 955 turns within and is guided by the bearing bracket assembly to engage and disengage the cam 957 and a cam keeper 961. The cam keeper 961 is mounted on the rear wall end frame 941. In one embodiment, the cam keeper 961 is mounted on the rear wall header member 997 and the first cross-member 908-1 of the rear wall end frame 941 of the rear wall 935.

The locking rod 955 mounted to the door 953 can move between a first predetermined position where the cam 957 is aligned with and can engage the cam keeper 961, as discussed above, and a second predetermined position. In the second predetermined position the cam 957 is disengaged from the cam keeper 961 and has a position relative the rear wall end frame 941 that allows the cam 957 and the door 953 to travel through the area, past the rear wall end frame 941 and the cam keeper 961 of the rear wall 935, and into the volume of the reversibly foldable intermodal freight container 971. In other words, in the second predetermined position portions of the locking rod 955 have been moved so as to position the cam 957 directly adjacent the surface of the door 953 so that the door 953 can be opened into the volume of the reversibly foldable intermodal freight container 971. Opening the door 953 into the volume of the reversibly foldable intermodal freight container 971 is accomplished, in addition to having the locking rod 955 in the second predetermined position, with the use of the hinge discussed in co-pending application entitled "Door Assembly for Freight Container" (WO 2013/025667), which is incorporated herein by reference in its entirety. These aspects for the reversibly foldable intermodal freight container 971 are also discussed in WO 2013/025676 entitled "Reversibly foldable intermodal freight container and Method for Positioning Doors of a Container Inside the Volume of the Container," which is incorporated herein by reference in its entirety. The first predetermined position is shown in FIG. 9, where the cam 957 and the cam keeper 961 are positioned relative each other so the cam 957 can engage and disengage the cam keeper 961 positioned on the rear wall end frame 941.

Figure 10A:
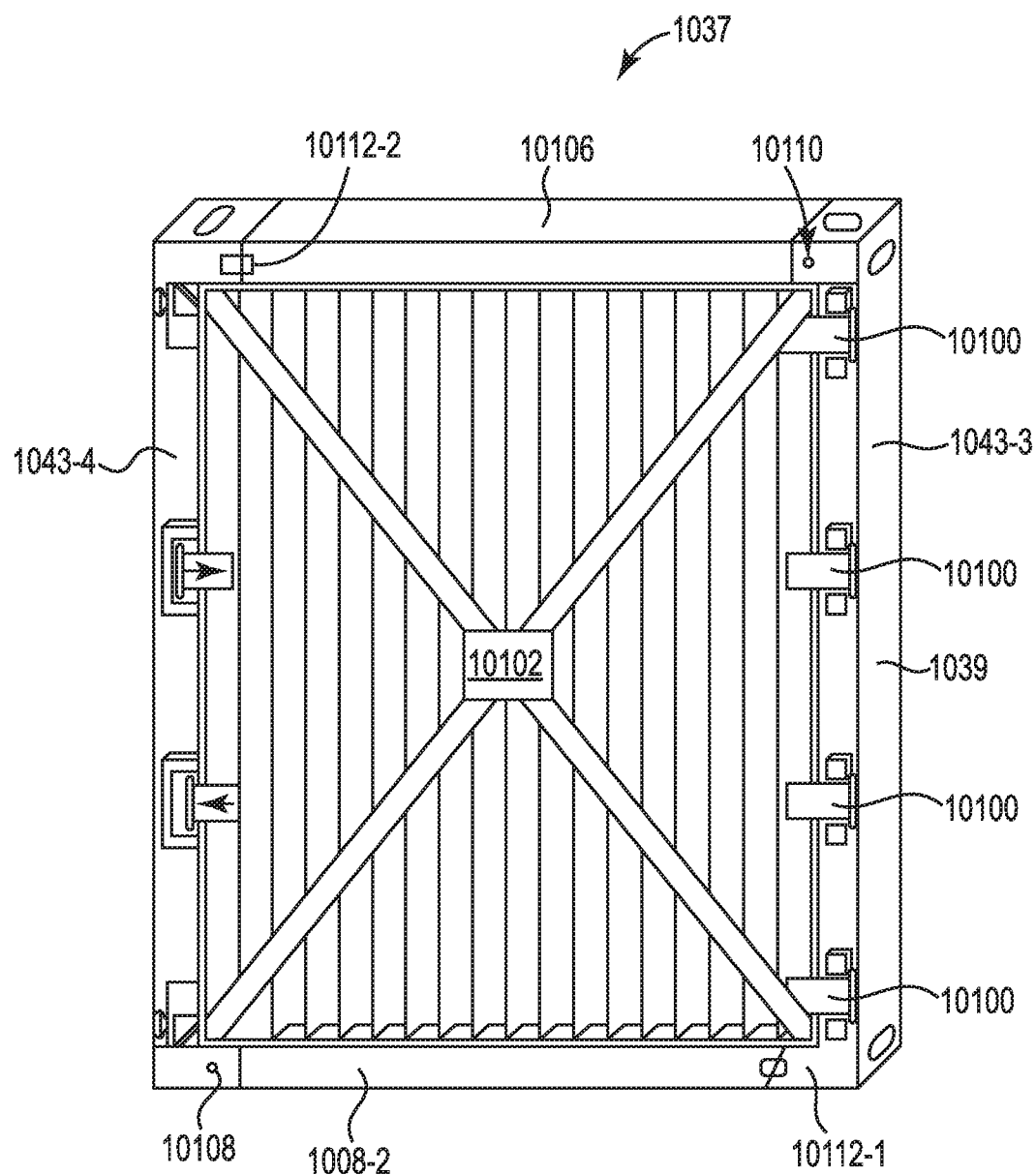
FIGS. 10A-10C illustrate a front wall of the reversibly foldable intermodal freight container according to an embodiment of the present disclosure.
Figure 10B:
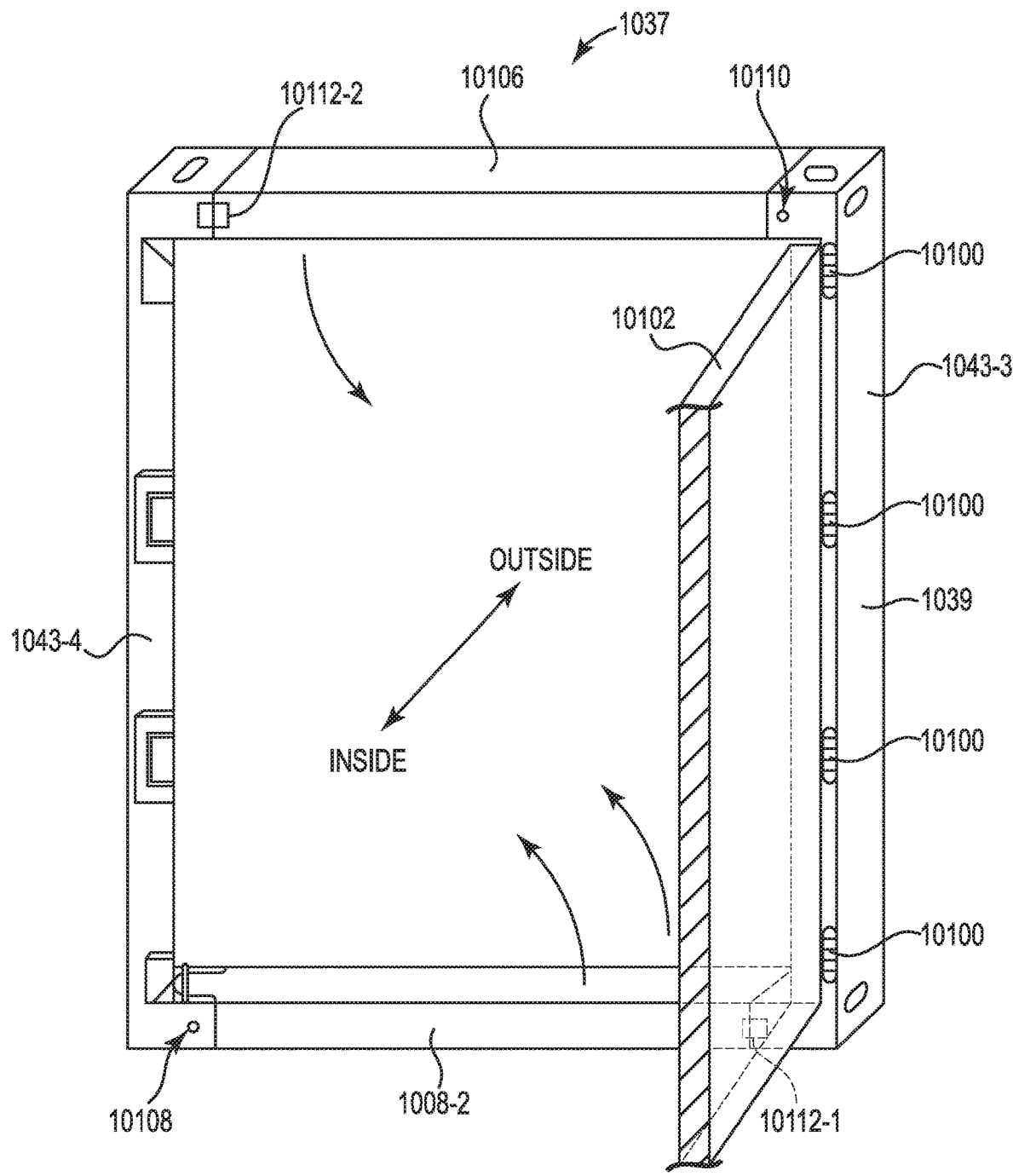
Figure 10C:
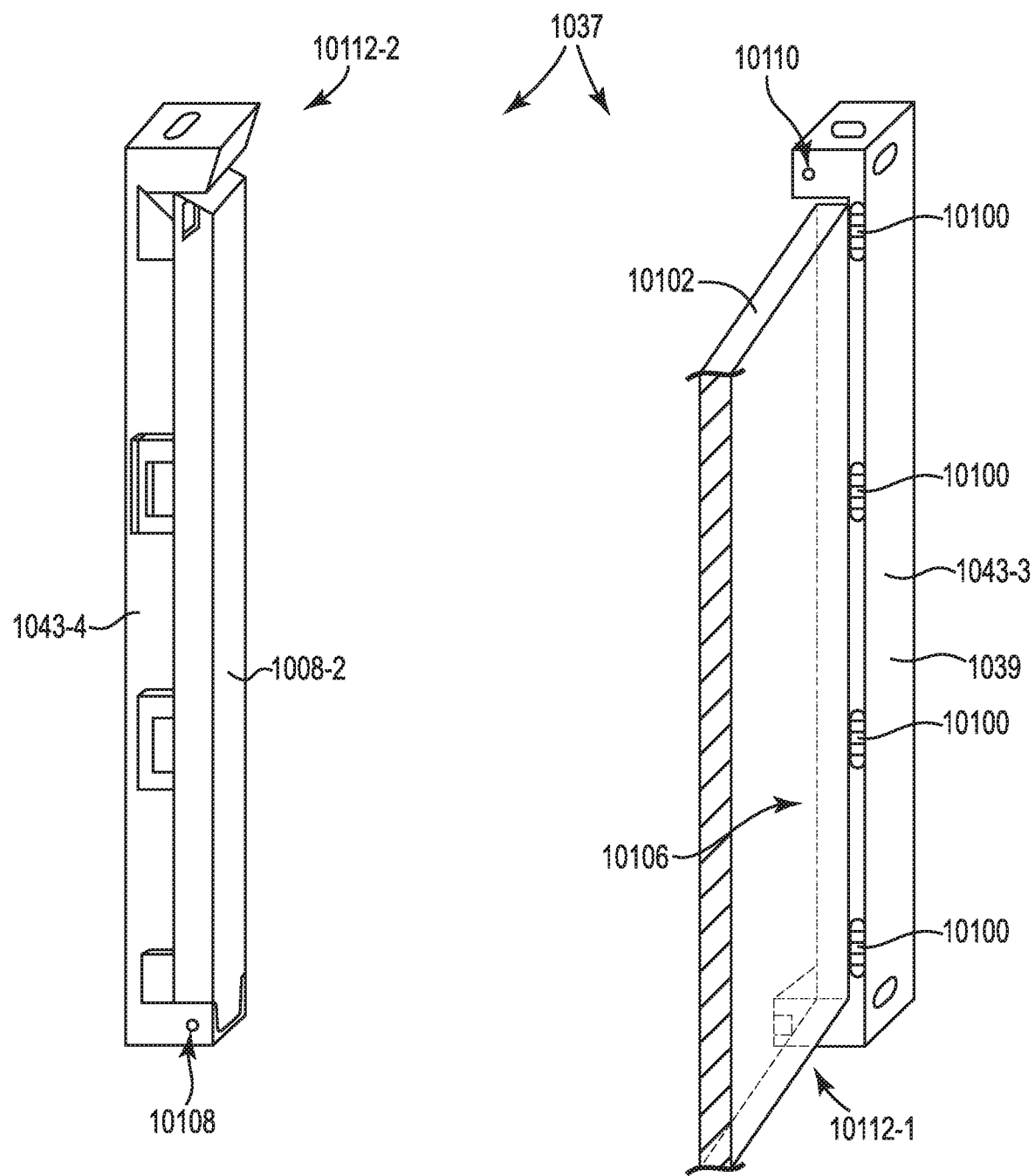

Referring now to FIGS. 10A-10C there is shown the front wall 1037 of the reversibly foldable intermodal freight container. The view of the front wall 1037 illustrated in FIGS. 10A-10C is taken along the view lines 10-10 shown in FIG. 9. As illustrated, the front wall 1037 includes the front wall end frame 1039 having the front wall corner posts 1043-3 and 1043-4, a front door hinge 10100 on the front wall corner post 1043-3 and a front door 10102 joined to the front door hinge 10100. The front door 10102 can pivot on the front door hinge 10100 into the volume of the reversibly foldable intermodal freight container and extend adjacent the interior surface of the sidewall structure.

The front wall end frame 1039 also includes the first cross-member 1008-1 and a front wall header member 10106, where the first cross-member 1008-1 and the front wall header member 10106 extend between the front wall corner posts 1043-3 and 1043-4. The first cross-member 1008-1 is connected to a first of the front wall corner post 1043-4 with a sill hinge 10108 that allows at least a portion of the first cross-member 1008-1 to fold towards a second of the front wall corner post 1043-2. Similarly, the front wall header member 10106 is connected to the second of the front wall corner post 1043-3 with a header hinge 10110 that allows at least a portion of the front wall header member 10106 to fold towards the first of the front wall corner post 1043-1. This ability of both the front wall header member 10106 and the first cross-member 1008-1 to fold is illustrated in FIGS. 10B and 10C. A pivot pin is used in the header hinge 10110 and the sill hinge 10108 to connect and allow for the rotation of the first cross-member 1008-1 relative the first of the front wall corner post 1043-1, and the front wall header member 10106 relative the second of the front wall corner post 1043-2.

A first of a latch 10112-1 is used to releasably connect the first cross-member 1008-1 to the first of the front wall corner post 1043-3. Similarly, a second of the latch 10112-2 is used to releasably connect the front wall header member 10106 to the second of the front wall corner post 1043-2. When in a locked position, the latch 10112 helps to prevent the first cross-member 1008-1 and the front wall header member 10106 from moving relative their respective front wall corner posts 1043-3 and 1043-4. When in an unlocked position, the front wall header member 10106 and the first cross-member 1008-1 can be folded towards their respective front wall corner posts 1043-3 and 1043-4 (illustrated in FIGS. 10B and 10C).

For example, the latch 10112-1 and 10112-2 can releasably connect these structures via a bolt or a fastener, where the bolt or fastener may be removed to allow the front wall header member 10106 to pivot substantially ninety degrees so that the front wall header member 10106 is adjacent (e.g. is substantially parallel to, the front wall corner post 1043-3). Likewise, the bolt or fastener that releasably connects the first cross-member 1008-1 and the front wall corner post 1043-3 may be removed to allow the first cross-member 1008-1 to pivot substantially ninety degrees so that the first cross-member 1008-1 is adjacent (e.g. is substantially parallel to, the front wall corner post 1043-4).

FIGS. 10A-10C show positioning the door 10102 of the front wall 1037 of a reversibly foldable intermodal freight container so that it can be inside a volume defined by the reversibly foldable intermodal freight container. As discussed herein, positioning the door 10102 of the front wall 1037 of the reversibly foldable intermodal freight container inside the volume defined by the reversibly foldable intermodal freight container includes unlocking the door 10102 from the front wall end frame 1039. Once unlocked the door 10102 can pivot on the door hinge 10100 so as to position the door 10102 inside the volume defined by the reversibly foldable intermodal freight container. FIG. 10B illustrates this state. FIG. 10B also shows that once the door 10102 has swung clear of the front wall header member 10106 and the first cross-member 1008-1, these members 10106 and 10104 can be folded towards their respective front wall corner post 1043. FIG. 10C illustrates the front wall header member 10106 and the first cross-member 1008-1 folded relative their respective front wall corner post 1043.

Referring now to FIGS. 11A-11D there is shown the rear wall 1135 of the reversibly foldable intermodal freight container 1171 of the present disclosure. As illustrated, the rear wall 1135 is joined with the roof structure 1129, the floor structure 1127 and the sidewall structures 1131-1 and 1131-2, where the roof structure 1129, the floor structure 1127, the interior surface of the sidewall structures 1131-1 and 1131-2 and the rear wall 1135 define a volume of the reversibly foldable intermodal freight container 1171.

As illustrated, the rear wall 1135 includes rear wall corner posts 1143-1 and 1143-2 and hinges on the rear wall corner posts 1143-1 and 1143-2 and a rear wall door 1153 joined to the hinge. FIGS. 11A-11D show the hinge un-locked to the rear wall corner post in the second predetermined position so that the rear wall door 1153 can pivot into the volume of the reversibly foldable intermodal freight container 1171 and extend adjacent the interior surface of the sidewall structures 1131-1 and 1131-2.

Figure 11A:
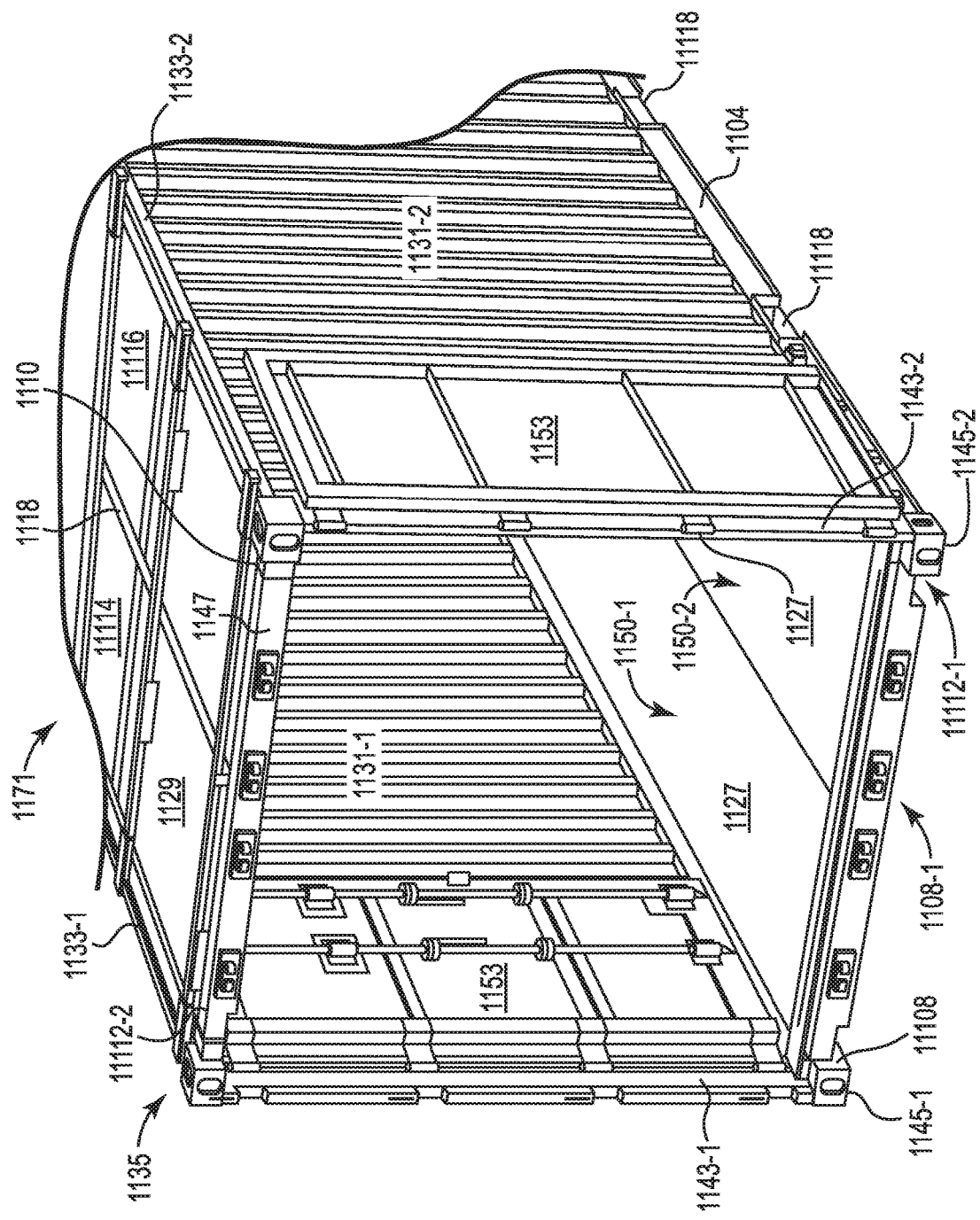

FIG. 11A shows the reversibly foldable intermodal freight container 1171 in an unfolded state having a defined maximum width measured at a predetermined point on each of two of the rear wall corner posts 1143-1 and 1143-2. Specifically, the predetermined points on each of two of the rear wall corner posts 1143-1 and 1143-2 are defined by an external surface of the corner fittings 1145-1 and 1145-2 as provided in ISO 668 Fifth Edition 1995-12-15. For the various embodiments, in the unfolded state the defined maximum width of the reversibly foldable intermodal freight container 1171 is eight (8) feet as provided in ISO 668 Fifth Edition 1995-12-15.

The rear wall 1135 includes a rear wall end frame 1141 having two of the rear wall corner posts 1143-1 and 1143-1, the first cross-member 1108-1 and a rear wall header member 1147. The first cross-member 1108-1 and the rear wall header member 1147 extend between the two of the rear wall corner posts 1143-1 and 1143-1. The first cross-member 1108-1 is connected to a first of the rear wall corner post 1143-1 with a sill hinge 11108 that allows at least a portion of the first cross-member 1108-1 to fold towards the first of the rear wall corner post 1143-1. The rear wall header member 1147 is connected to a second of the rear wall corner post 1143-2 with a header hinge 11110 that allows at least a portion of the rear wall header member 1147 to fold towards the second of the rear wall corner post 1143-2.

Figure 11B:
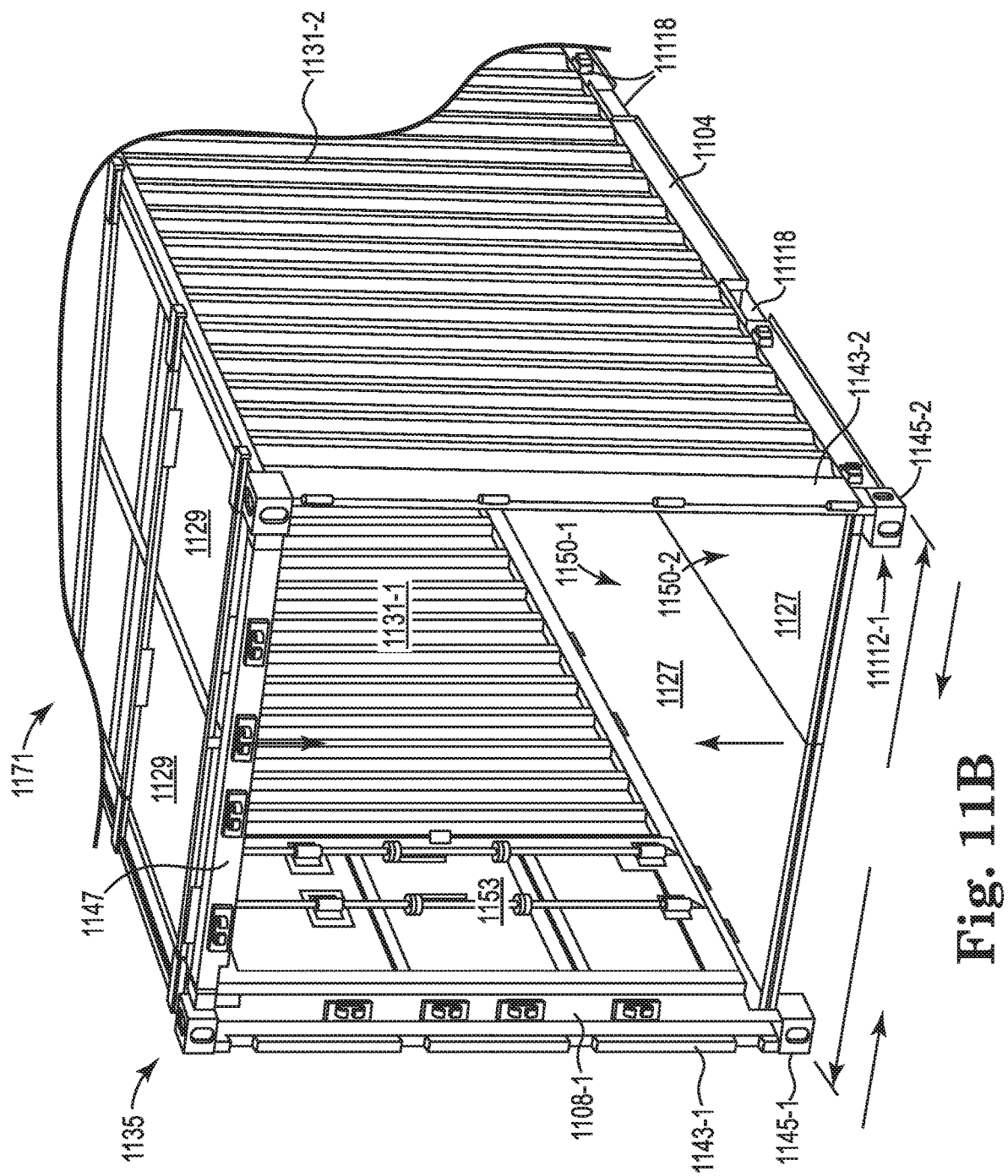
Figure 11C:
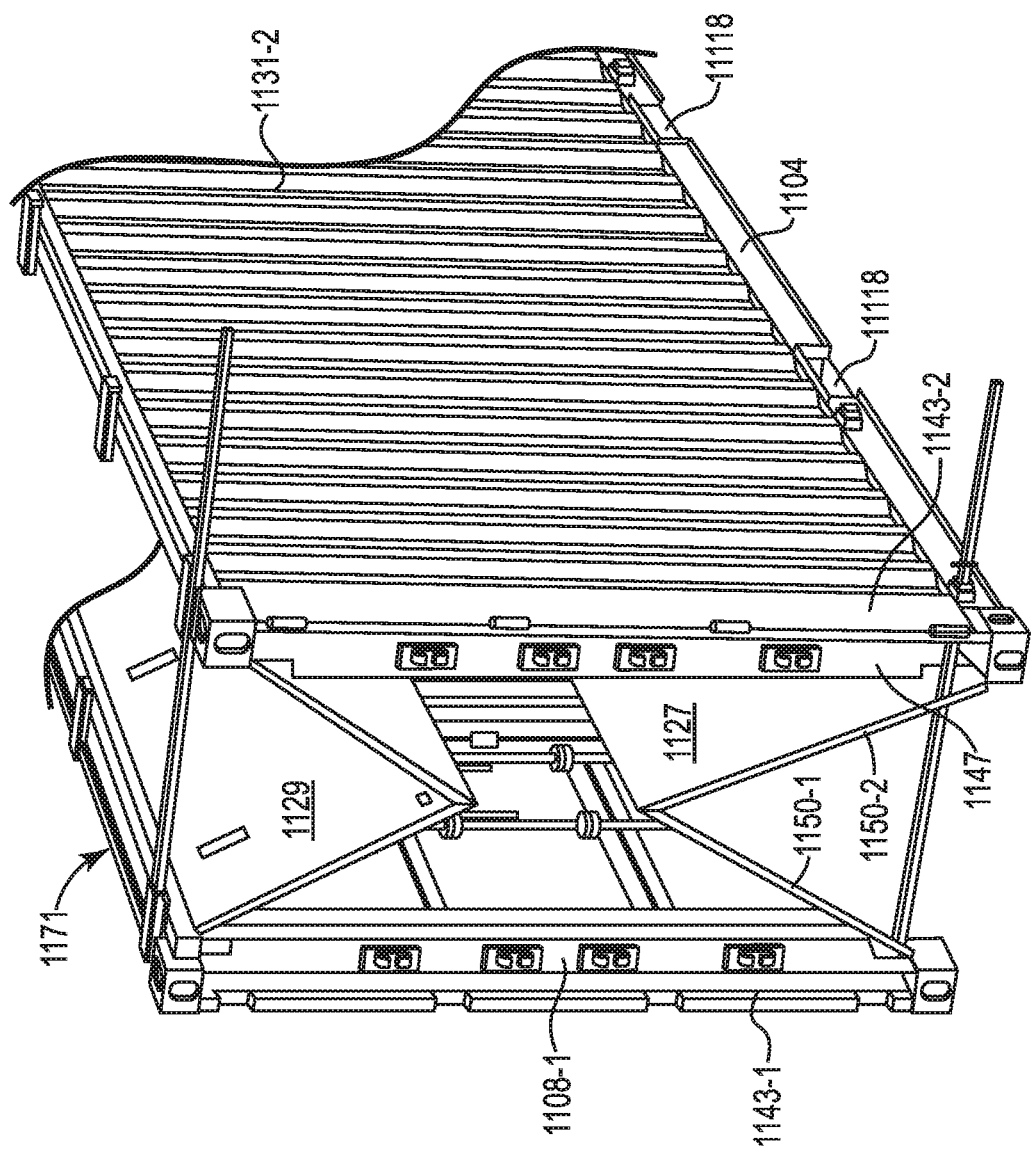

This ability of both the rear wall header member 1147 and the first cross-member 1108-1 to fold is illustrated in FIGS. 11A and 11B. A pivot pin is used in the header hinge 11110 and the sill hinge 11108 to connect and allow for the rotation of the first cross-member 1108-1 relative the first of the rear wall corner post 1143-1, and the rear wall header member 1147 relative the second of the rear wall corner post 1143-2.

A first of a latch 11112-1 is used to releasably hold the first cross-member 1108-1 to the second of the front wall corner post 1143-2. Similarly, a second of the latch 11112-2 is used to releasably hold the rear wall header member 1147 to the first of the rear wall corner post 1143-1. When in a locked position, the latch 11112-1 and 11112-2 helps to prevent the first cross-member 1108-1 and the rear wall header member 1147 from moving relative their respective rear wall corner posts 1143-1 and 1143-2. When in an unlocked position, the rear wall header member 1147 and the first cross-member 1108-1 can be folded towards their respective rear wall corner post 1143-1 and 1143-2 (illustrated in FIGS. 11A and 11B). Embodiments of the door hinges, the latch 11112 and the rear wall 1135 can be found in WO 2015/127236 entitled "Corner Fitting, Rear Corner Post and Rear Wall Therewith, Front Corner Post and Front Wall Therewith for A Freight Container" and published on 27 Aug. 2015, the entire contents of which are incorporated herein by reference in their entirety.

The roof structure 1129 may include a first roof panel section 11114, a second roof panel section 11116, and a third roof panel section 11118. The roof structure 1129 is reversibly foldable. For example, as the joined members fold into the reversibly foldable intermodal freight container 1171, the roof panel sections 11114, 11116, 11118 may also fold into the reversibly foldable intermodal freight container 1171. The roof structure 1129 may be connected by one or more hinges to the first upper side rail 1133-1 and the second upper side rail 1133-2.

The third roof panel section 11118 can be positioned between the first roof panel section 11114 and the second roof panel section 11116. The third roof panel section 11118 is connected to the first roof panel section 11114 and the second roof panel section 11116 by one or more hinges. For one or more embodiments, the one or more hinges can be a flexure bearing (e.g. a living hinge) that extends along a longitudinal axis of the roof structure.

In the unfolded state, each of the roof panel sections 11114, 11116, 11118 may be substantially parallel to one another (e.g. each roof panel section may be substantially parallel to the jointed members in the first predetermined state). In the unfolded state the roof may be referred to as flat. In the second predetermined state, roof panel sections 11114, 11116 may be substantially parallel to one another, while each of the roof panel sections 11114, 11116 is substantially perpendicular to the roof panel section 11118. In the second predetermined state, the roof may be referred to as a partial rectangle.

For one or more embodiments, the reversibly foldable intermodal freight container include container flooring 1150. The container flooring 1150 may include a first floor section 1150-1 and a second floor section 1150-2. The container flooring 1150 may be connected to a number the plurality of jointed members (e.g. adjacent the first bottom side rail 1131-1 and/or the second bottom side rail 1131-2). The reversibly foldable intermodal freight container 1171 also includes forklift pockets 11118. The forklift pockets 11118 may each be a respective opening in the first and second bottom side rails 1102 and 1104.

The parts of the intermodal freight container of the present disclosure can be made of a variety of materials. Such materials include, but are not limited to, a metal or a metal alloy. Examples of metal include, but are not limited to, steel such as 'weathering steel' specified within standard BS EN 10025-5:2004, which is also known as CORTEN steel. Other examples include, but are not limited to, corrosion resistant alloys formed from mixtures of various metals such as stainless steel, chrome, nickel, iron, copper, cobalt, molybdenum, tungsten and/or titanium. Combined, these metals can resist corrosion more effectively than standard carbon steel.

Figure 12:
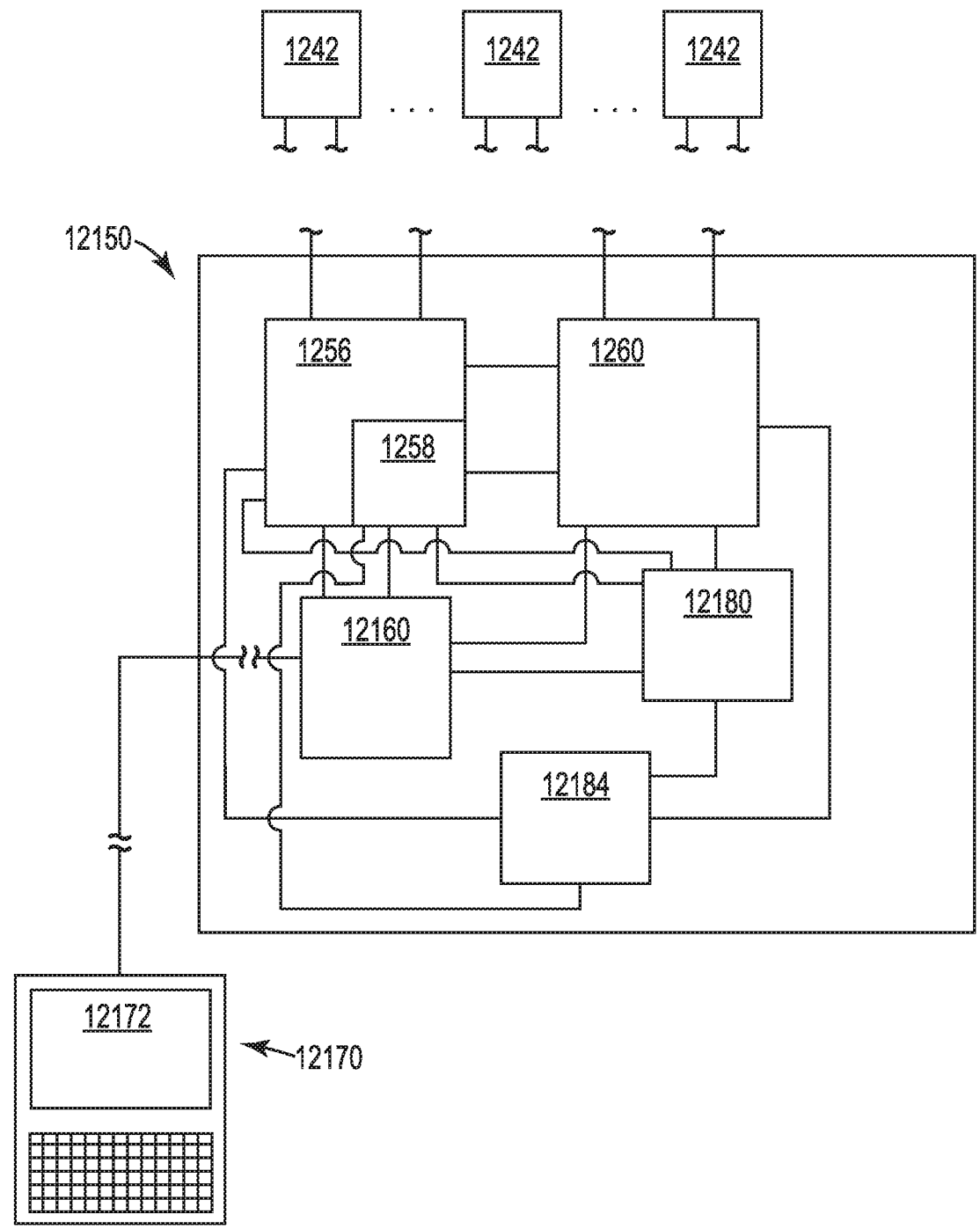
FIG. 12 is a controller for the scale according to one embodiment of the present disclosure.

FIG. 12 provides an illustration of the controller 12150 for the scale of the present disclosure. The controller 12150 can be located, for example, within the side rail in a secure location accessible only when the container is empty. The controller 12150 includes the microprocessor 1256 with memory 1258, as previously discussed. Instructions for receiving, processing and providing outputs from the controller 12150 of the scale are stored in the memory 1258 and executable by the microprocessor 1256. The memory 1258 can be any type of storage medium that can be accessed by the microprocessor 1256 to perform various examples of the present disclosure. For example, the memory 1258 can be a non-transitory computer readable medium having computer readable instructions (e.g., computer program instructions) stored thereon that are executable by the microprocessor 1256 to receive electrical signals from one or more of the load cells 1242 and convert the electrical signals to a weight value for mass positioned on the container flooring of the intermodal freight container in accordance with one or more embodiments of the present disclosure.

The memory 1258 can be volatile or nonvolatile memory. The memory 1258 can also be removable (e.g., portable) memory, or non-removable (e.g., internal) memory. For example, the memory 1258 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although the memory 1258 is illustrated as being located in the controller 12150, embodiments of the present disclosure are not so limited. For example, the memory 1258 can also be located internal to another computing resource (e.g., enabling computer readable instructions to be downloaded over the Internet or another wired or wireless connection).

The controller 12150 can further include the power source 1260 for the operation of the microprocessor 1256, memory 1258 and the load cell 1242, among other components. The power source 1260 can be an electric battery consisting of one or more electrochemical cells with external connections provided to power the microprocessor 1256, memory 1258 and the load cell(s) 1242, among other components. The electric battery can be either a single use battery or a rechargeable battery. Other power sources are possible, including solar power sources and/or alternating current sources.

The microprocessor 1256 receives and stores in memory 1258 electrical signals from the load cell 1242 indicating the weight of the mass inside of the intermodal freight container. Embodiments of the load cell 1242 have been described herein. As discussed, the load cells 1242 are located and joined to one or both of the bottom side rails (e.g., 202 and/or 204 of FIG. 2 or 702 and/or 704 of FIG. 7) and optionally with the jointed member and/or container flooring. The scale can include different configurations of the load cells along the longitudinal length of the bottom side rails. Such configurations of the load cells 1242 can allow for weighing zones to be defined in predefined areas of the container flooring. For example, electrical signals generated from two or more load cells adjacent to a predefined area of the container flooring can be integrated by the microprocessor 1256 to provide a weight value for the mass present in the predefined area of the weighing zone. Two or more weighting zones can be present along the container flooring, where each zone includes one or more of the jointed members and associated load cell(s) 1242.

The container flooring in each weighing zone can also be isolated from each adjacent weighting zone. For example, the container flooring and associated jointed member(s) for each weighing zone can be physically separated from the container flooring and associated jointed member(s) of each adjacent weighing zone. This allows each weighing zone to move independently from the other weighing zones.

The controller 12150 also includes a communication link 12160. The communication link 12160 can interface with a computing device 12170. Examples of the computing device 12170 include, but are not limited to, a laptop computer, a desktop computer, or a mobile device (e.g., a smart phone, a personal digital assistant (PDA), a tablet, etc.), among other types of computing devices. The display 12172 of the computing device 12170 can be a user interface (e.g., screen) that can provide (e.g., display and/or present) information to a user of the computing device 12170. Such information can include data regarding the weight of the mass inside the intermodal freight container measured by the scale of the present disclosure, the weight of mass in different weighing zones and/or other properties recorded and stored in memory 1258.

The computing device 12170 can receive information from the user of the display 12172 through an interaction with the user via the display 12172. For example, the computing device 12170 can receive input from the user via the display 12172. The user can enter inputs into computing device 12172 using, for instance, a mouse and/or keyboard associated with computing device 12170, or by touching the display 12172 in embodiments in which the display 12172 includes touch-screen capabilities (e.g., embodiments in which the display 12172 is a touch screen). The display 12172 can also be used to provide programming to the controller 12150, where such programming can include the defining of weighting zones, activate or deactivate load cells and/or other sensors as discussed herein, among other things.

The communication link 12160 of the controller 12150 can be electrically coupled to the computing device 12170 via wired or wireless technologies. For example, the communication link 12160 is in communication with the microprocessor 1256 via which controller 12150 communicates (e.g., exchange symbols or signals representing data or information) with other computing devices, data stores, security targets, and/or services via, for example, a communications link (e.g., a wired communications link, optical communications link, or wireless communications link). In one embodiment, the communication link 12160 can be a wireless transmitter operatively coupled to the microprocessor 1256 and the power source 1260, where the wireless transmitter transmits an output signal indicating the weight of the mass inside the intermodal freight container. The wireless transmitter can transmit standard based transmissions compliant with IEEE 802.11, 380.11, 380.15 and/or 380.15.4. Communication link 12160 can also include hardware (e.g., pins, connectors, or integrated circuits) and software (e.g., drivers or communications stacks). For example, communication link 12160 can implement an electrical communications interface, an optical communications interface, a wireless communications interface, an Ethernet interface, a Fiber Channel interface, an InfiniBand interface, or another communications interface.

The following are other sensors and devices for use with the controller 12150. These can include, but are not limited to an accelerometer 12180 coupled to the power source 1260 and where the microprocessor 1256 receives and stores in memory 1258 the electrical signal from the accelerometer 12180 representative of acceleration of the intermodal freight container. The controller 12150 can also include a transceiver 12184 (e.g., a GPS module) operatively coupled to the microprocessor 1256, where the transceiver can receive signals from which a geographical location of the intermodal freight container can be determined and stored in the memory. The transceiver 12184 can also be used to transmit a warning signal if the weight of the mass on the container floor changes by a predetermined amount. The memory 1258 can also be programmed to operate the controller 12150 in a continuous or an intermittent fashion.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A scale for measuring a weight of a mass inside of an intermodal freight container, comprising:
   a first bottom side rail of the intermodal freight container and a second bottom side rail of the intermodal freight container, each of the first bottom side rail and the second bottom side rail having a longitudinal axis parallel to each other;

a first cross-member and a second cross-member, wherein the first cross-member and the second cross-member join the first bottom side rail and the second bottom side rail of the intermodal freight container;

a jointed member positioned longitudinally between the first cross-member and the second cross-member and laterally, relative the longitudinal axis, between the first bottom side rail and the second bottom side rail, the jointed member having:

a first elongate section having a first member end and a second member end, wherein the first member end is joined to first bottom side rail with a first hinge, wherein the first hinge has a fixed axis of rotation relative to and parallel with the longitudinal axis of the first bottom side rail;

a second elongate section having a first member end and a second member end, wherein the first member end is joined to second bottom side rail with a second hinge, wherein the second hinge has a fixed axis of rotation that is co-planar with the fixed axis of rotation of the first hinge and parallel with the longitudinal axes of the first bottom side rail and the second bottom side rail; and a third hinge that connects the second member end of the first elongate section and the second member end of the second elongate section, wherein the third hinge has an axis of rotation that is parallel with the fixed axis of rotation of the first hinge and the fixed axis of rotation of the second hinge, wherein the first elongate section of the jointed member includes a first surface defining a first obround opening, the second elongate section includes a second surface defining a second obround opening and the third hinge includes a fastener passing through the first obround opening and the second obround opening to connect the first elongate section and the second elongate section, wherein the fastener in a first predetermined state has a longitudinal axis that is offset from but parallel with the fixed axis of rotation of the first hinge and the fixed axis of rotation of the second hinge;

a load cell associated with the first bottom side rail;

a container floor positioned over the jointed member to allow force from a weight of a mass on the container floor having the jointed member in the first predetermined state to be transferred through the third hinge, the first hinge and the second hinge into a first lateral force, relative the force from the weight of the mass, through the first member end of the first elongate section into the first bottom side rail, wherein the load cell provides an electrical signal whose magnitude is representative of the first lateral force being imparted by the weight of the mass, where the first cross-member and the second cross-member help to hold the first bottom side rail and the second bottom side rail of the intermodal freight container in static equilibrium against the first lateral force being imparted by the weight of the mass; and a controller having a microprocessor and memory, instructions stored in the memory and executable by the microprocessor, and a power source for the operation of the microprocessor and the load cell, wherein the microprocessor receives and stores in memory the electrical signal from the load cell indicating the weight of the mass inside of the intermodal freight container.

2. The scale of claim 1, wherein the first member end of the first elongate section include a first L-beam and the first member end of the second elongate section include a second L-beam, the first L-beam and the second L-beam extending parallel with the first bottom side rail and the second bottom side rail, and wherein the first hinge joins the first member end of the first elongate section along a first face of the first L-beam to the first bottom side rail and the second hinge joins the first member end of the second elongate section along a first face of the second L-beam to the second bottom side rail.

3. The scale of claim 2, wherein a second face of the first L-beam transfers the first lateral force to the load cell associated with at least the first bottom side rail.

4. The scale of claim 1, wherein the load cell is contained within the first bottom side rail of the container.

5. The scale of claim 1, further including a second load cell associated with the second bottom side rail, wherein force from the weight of the mass on the container floor having the jointed member in the first predetermined state is transferred through the third hinge, the first hinge and the second hinge into a second lateral force, relative the force from the weight of the mass, through the second member end of the second elongate section into the second bottom side rail, wherein the second load cell provides an electrical signal whose magnitude is representative of the second lateral force being imparted by the weight of the mass, where the first cross-member and the second cross-member help to hold the first bottom side rail and the second bottom side rail of the intermodal freight container in static equilibrium against the second lateral force being imparted by the weight of the mass; and wherein the power source allows for the operation of the microprocessor and the second load cell, and wherein the microprocessor receives and stores in memory the electrical signal from the second load cell indicating the weight of the mass inside of the intermodal freight container.

6. The scale of claim 1, wherein the first elongate section further includes a first abutment member opposite the first member end, and the second elongate section further includes a second abutment member opposite the second member end, where in the first predetermined state the first abutment member and the second abutment are in physical contact and a portion of the first surface and a portion of the second surface are in physical contact with the fastener to transfer the force from the weight of the mass on the container floor having the jointed member in the first predetermined state through the first hinge, the second hinge and the fastener into the first lateral force.

7. The scale of claim 6, wherein the first abutment member and the second abutment member form an abutment joint, wherein:

the first abutment member has a projection that extends from first abutment member shoulders of the first abutment member, the projection having a distal end from which a first surface and a second surface extend towards the first abutment member shoulders at an acute angle; and wherein the second abutment member has a socket into which the projection of the first abutment member releasably seats, the socket having a first surface and a second surface that extend away from a first end of the second abutment member at an acute angle and the first end of the second abutment member includes second abutment member shoulders that extends from the socket such that when the projection of the first abutment member seats in the socket of the second abutment member the second surface of the projection and the second surface of the socket touch, and the second abutment member shoulders and the first abutment member shoulders touch.

8. The scale of claim 1, wherein an upper surface of the first cross-member and the second cross-member that is closest to the container flooring is located at a vertical position on the first bottom side rail and the second bottom side rail that is offset from an upper surface of the first elongate section and the second elongate section.

9. The scale of claim 1, wherein the container floor does not contact the first cross-member and the second cross-member joining the first bottom side rail and the second bottom side rail of the intermodal freight container.

10. The scale of claim 1, wherein the first cross-member and the second cross-member are not joined to a hinge or form a part of the hinge with the first bottom side rail and the second bottom side rail, respectively, of the intermodal freight container.

11. The scale of claim 1, wherein the first obround opening and the second obround opening move relative each other and the fastener as the jointed member transitions from the first predetermined state having a minimum overlap of the first obround opening and the second obround opening and the projection of the first abutment member seated in socket of the second abutment member towards the second predetermined state having a maximum overlap of the first obround opening and the second obround opening relative the minimum overlap and the projection of the first abutment member un-seated from the socket of the second abutment member.

12. The scale of claim 11, wherein in the first predetermined state a distance between the first member end of the first elongate section and the second member end of the second elongate section provides a defined maximum length of the jointed member, wherein the distance between the first member end of the first elongate section and the second member end of the second elongate section does not exceed a defined maximum length as jointed member transitions from the first predetermined state towards the second predetermined state.

13. The scale of claim 12, wherein the first abutment member and the second abutment member define a first point of rotation for the first elongate section and the second elongate section; and a second end of both the first surface and the second surface, when positioned against the fastener, define a second point of rotation for the first abutment member and the second abutment member that is different than the first point of rotation, wherein the first elongate section and the second elongate section turn on the first point of rotation prior to turning on the second point of rotation as the jointed member transitions from the first predetermined state towards the second predetermined state.

14. The scale of claim 12, wherein a first end of each of the first surface and the second surface does not contact the fastener when the second end of both the first surface and the second surface are seated against the fastener.

15. The scale of claim 1, further including an accelerometer coupled to the power source and where the microprocessor receives and stores in memory the electrical signal from the accelerometer representative of acceleration of the intermodal freight container.

16. The scale of claim 1, further including a wireless transmitter operatively coupled to the microprocessor and the power source, where the wireless transmitter transmits an output signal indicating the weight of the mass inside the intermodal freight container.

17. The scale of claim 1, wherein the power source is a rechargeable battery.

18. The scale of claim 1, further including a transceiver operatively coupled to the microprocessor, where the transceiver can receive signals from which a geographical location of the intermodal freight container is determined and stored in the memory.

19. The scale of claim 18, where the transceiver can transmit a warning signal if the weight of the mass on the container floor changes by a predetermined amount.

* * * * *